United States Patent
Yuuki et al.

(10) Patent No.: US 8,348,490 B2
(45) Date of Patent: Jan. 8, 2013

(54) PLANAR LIGHT SOURCE DEVICE AND METHOD OF MANUFACTURING DIVIDED PRISM MOLD

(75) Inventors: Akimasa Yuuki, Tokyo (JP); Kenji Itoga, Tokyo (JP); Naoko Iwasaki, Tokyo (JP); Suguru Nagae, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 239 days.

(21) Appl. No.: 12/919,382

(22) PCT Filed: Feb. 19, 2009

(86) PCT No.: PCT/JP2009/052834
§ 371 (c)(1),
(2), (4) Date: Aug. 25, 2010

(87) PCT Pub. No.: WO2009/107533
PCT Pub. Date: Sep. 3, 2009

(65) Prior Publication Data
US 2011/0002142 A1 Jan. 6, 2011

(30) Foreign Application Priority Data
Feb. 25, 2008 (JP) ................................. 2008-043251

(51) Int. Cl.
*F21V 7/04* (2006.01)
(52) U.S. Cl. ......... 362/606; 362/620; 362/626; 362/623
(58) Field of Classification Search .................. 362/606, 362/620, 626, 623, 607, 609
See application file for complete search history.

(56) References Cited

U.S. PATENT DOCUMENTS

| 7,210,836 | B2 | 5/2007 | Sasagawa et al. | |
|---|---|---|---|---|
| 2002/0145860 | A1* | 10/2002 | Lee | 362/26 |
| 2003/0048630 | A1* | 3/2003 | Okuwaki | 362/31 |
| 2003/0231483 | A1* | 12/2003 | Higashiyama | 362/31 |
| 2004/0022515 | A1* | 2/2004 | Sugiura et al. | 385/146 |
| 2007/0047214 | A1* | 3/2007 | Nesterenko et al. | 362/19 |
| 2007/0230211 | A1* | 10/2007 | Osato et al. | 362/600 |

FOREIGN PATENT DOCUMENTS

| JP | 11 64791 | 3/1999 |
|---|---|---|
| JP | 2004 319228 | 11/2004 |
| JP | 2004 319251 | 11/2004 |
| JP | 2004 319252 | 11/2004 |
| JP | 2004 335209 | 11/2004 |
| JP | 2005 85678 | 3/2005 |
| JP | 2006 236804 | 9/2006 |
| WO | 2004 027492 | 4/2004 |

* cited by examiner

OTHER PUBLICATIONS

U.S. Appl. No. 13/297,708, filed Nov. 16, 2011, Yuki, et al.

*Primary Examiner* — Evan Dzierzynski
(74) *Attorney, Agent, or Firm* — Oblon, Spivak, McClelland, Maier & Neustadt, L.L.P.

(57) ABSTRACT

A planar light source device capable of increasing light use efficiency and preventing color breakup without using any reflection polarizing plate nor performing multiple reflection. The planar light source device includes a planar light guide plate, light sources arranged as to be opposed to end surfaces of the light guide plate on its both sides, and a divided prism formed in a back surface inside the light guide plate and that reflects light incident upon the light guide plate from the light sources toward a front surface side of the light guide plate. The divided prism includes a prism portion and a dividing portion both of which have a width equal to or less than the wavelength of light from the light sources and is formed with the prism portion and the dividing portion alternately repeated along a direction parallel to the end surfaces of the light guide plate which are opposed to the light sources.

11 Claims, 15 Drawing Sheets

F I G. 1 4
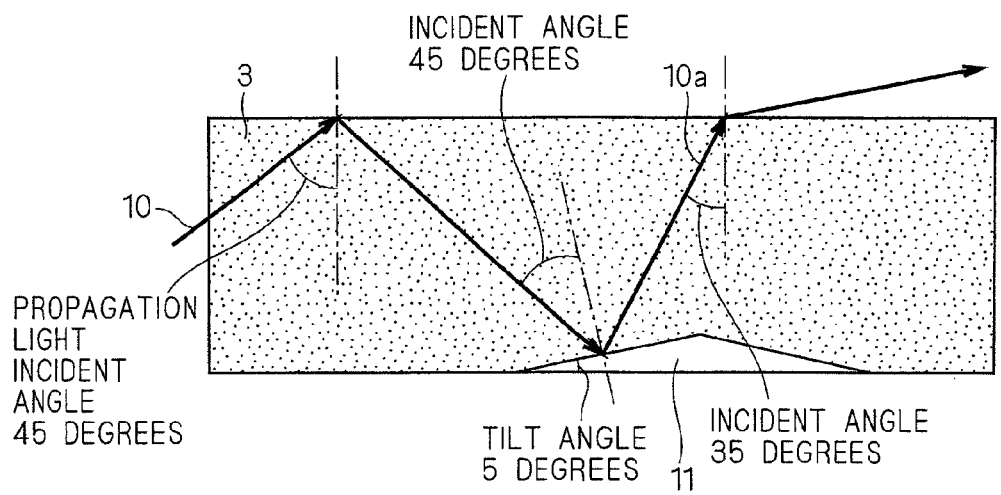
F I G. 1 5
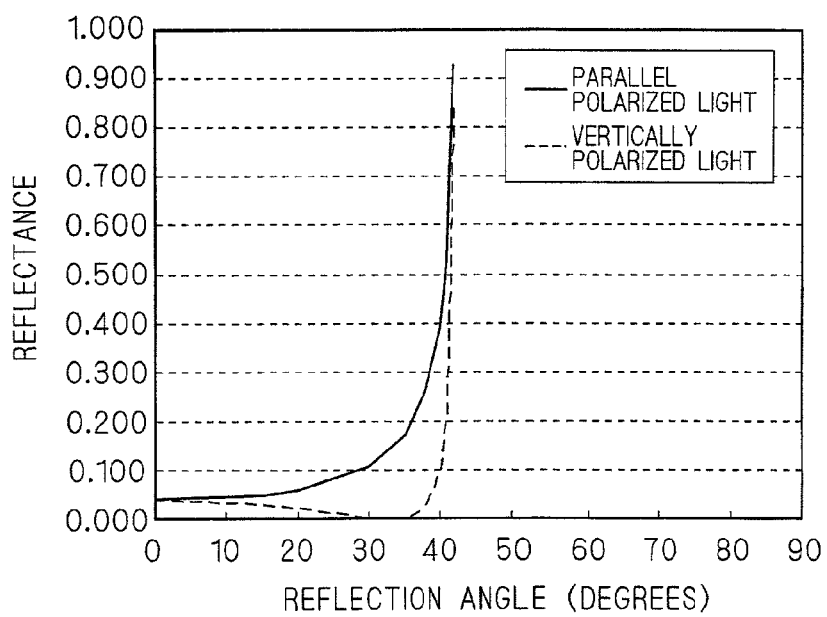

PLANAR LIGHT SOURCE DEVICE AND METHOD OF MANUFACTURING DIVIDED PRISM MOLD

TECHNICAL FIELD

The present invention relates to a planar light source device which can be used for liquid crystal displays and the like.

BACKGROUND ART

Patent Document 1 discloses a naked eye stereoscopic vision display device. As shown in FIG. 1A of Patent Document 1, the display device comprises a light guide plate 2, light sources 1a and 1b which are so arranged as to be opposed to light incident surfaces of the light guide plate 2 on its both sides, a double-sided prism sheet 3 which is so arranged as to be opposed to the side of a light exit surface of the light guide plate 2 and has a light incident surface provided with a triangular prism row extending in a direction parallel to the light incident surface of the light guide plate 2 and a light exit surface opposite to the side of the light guide plate 2, which is provided with a semicylindrical lens row extending in parallel with the triangular prism row, a transmission type display panel 4 which is so arranged as to be opposed to the side of the light exit surface of the double-sided prism sheet 3, and a synchronous drive means 5 for driving the light sources 1a and 1b to light in synchronization with left and right parallax images which are alternately displayed on the transmission type display panel 4 and outputting light rays from the light sources 1a and 1b from the transmission type display panel 4 at angles corresponding to left and right parallaxes, respectively.

The display device has the effect of displaying high quality stereoscopic images with less crosstalk and allowing different images to be displayed simultaneously on the same screen since the light rays from the light sources 1a and 1b are emitted from the transmission type display panel 4 at angles corresponding to the left and right parallaxes, respectively.

Patent Document 2 discloses a backlight device using a reflection polarizing plate to emit linearly polarized light in order to achieve higher luminance of liquid crystal displays. As shown in FIG. 1 of Patent Document 2, the backlight device comprises a light guide plate 101b, a reflection polarizing plate 102 which is so arranged as to be opposed to the side of a light exit surface of the light guide plate 101b, a quarter wave phase difference plate 104 which is so arranged as to be opposed to a surface of the light guide plate 101b on the side opposite to the light exit surface thereof, and a reflection plate 103 provided on the side of a back surface of the phase difference plate 104.

In the backlight device, linearly polarized light out of exit light from the light exit surface of the light guide plate 101b which goes along a transmission axis of the reflection polarizing plate 102 passes through the reflection polarizing plate 102. On the other hand, the remaining polarized light is reflected by the reflection polarizing plate 102 and further reflected by the reflection plate 103, passing through the phase difference plate 104 twice, whereby the remaining polarized light is converted into linearly polarized light along the transmission axis of the reflection polarizing plate 102 and passes through the reflection polarizing plate 102. Thus, the polarized light out of the exit light from the light guide plate 101b which does not go along the transmission axis of the reflection polarizing plate 102 is multiply reflected between the reflection polarizing plate 102 and the reflection plate 103 through the phase difference plate 104, whereby the polarized light is converted into the linearly polarized light along the transmission axis of the reflection polarizing plate 102 and passes through the reflection polarizing plate 102. This increases the light use efficiency.

Since light is multiply reflected between the reflection polarizing plate 102 and the reflection plate 103 in this backlight device as discussed above, however, if this backlight device is used as a backlight unit of the naked eye stereoscopic vision display device of Patent Document 1, the backlight device arises a problem of crosstalk occurring between the left and right parallax images and this makes it difficult to display stereoscopic images.

Further, since the reflection polarizing plate is expensive, the manufacturing cost disadvantageously increases.

Patent Document 3 also discloses a backlight device like that of Patent Document 2.

Patent Documents 4 and 5 each disclose a backlight device in which a diffraction grating which scatters light with high directivity is formed on a light guide plate. Since light is reflected by using diffraction phenomenon caused by the diffraction grating, however, the backlight device has a problem that the direction of the diffraction varies depending on the wavelengths and there occurs color breakup due to the difference of the wavelength. Patent Documents 4 and 5 each have no mention about the polarization state of the exit light from the light guide plate and it is not certain if much polarized light to be effectively used for liquid crystal panels can be taken.

[Patent Document 1] WO2004/027492
[Patent Document 2] Japanese Patent Application Laid Open Gazette No. 11-64791
[Patent Document 3] Japanese Patent Application Laid Open Gazette No. 2006-236804
[Patent Document 4] Japanese Patent Application Laid Open Gazette No. 2004-319251
[Patent Document 5] Japanese Patent Application Laid Open Gazette No. 2004-319252

DISCLOSURE OF INVENTION

The present invention is intended to solve the above problems, and it is an object of the present invention to provide a planar light source device which is capable of increasing light use efficiency and preventing color breakup without using any reflection polarizing plate nor performing multiple reflection.

The present invention is intended for a planar light source device. According to a first aspect of the present invention, the planar light source device includes a planar light guide plate, a light source which is so arranged as to be opposed to at least one of both end surfaces of the light guide plate, and a divided prism formed in a back surface inside the light guide plate, for reflecting light incident upon the light guide plate from the light source toward a front surface side of the light guide plate, and in the planar light source device, the divided prism has a prism portion and a dividing portion both of which have a width equal to or less than the wavelength of light from the light source and is formed with the prism portion and the dividing portion alternately repeated along a direction parallel to the end surface of the light guide plate which is opposed to the light source.

According to a second aspect of the present invention, the planar light source device includes a planar light guide plate, a light-source light guide plate which is so arranged as to be opposed to at least one of both end surfaces of the light guide plate, a light source which is so arranged as to be opposed to at least one of both end surfaces of the light-source light guide plate, a reflecting prism formed in a back surface inside the light guide plate, extending in a direction parallel to the light-source light guide plate, and a divided prism formed in a surface inside the light-source light guide plate which is opposite to a surface thereof opposed to the light guide plate, for reflecting light incident upon the light-source light guide plate from the light source toward the surface opposed to the light guide plate, and in the planar light source device, the divided prism has a prism portion and a dividing portion both of which have a width equal to or less than the wavelength of light from the light source and is formed with the prism portion and the dividing portion alternately repeated along a direction parallel to the end surface of the light-source light guide plate which is opposed to the light source.

In the planar light source device of the first aspect of the present invention, since the divided prism has the prism portion and the dividing portion both of which have a width equal to or less than the wavelength of light from the light source and is formed with the prism portion and the dividing portion alternately repeated along the direction parallel to the end surface of the light guide plate which is opposed to the light source, it is possible to change reflected light which is reflected by the divided prism to light containing parallel polarized light (polarized light parallel to the direction of the ridge of the divided prism 11) considerably more than vertically polarized light (polarized light perpendicular to the direction of the ridge of the divided prism 11) (in other words, it is possible to change the reflected light to light having high degree of polarization). This increases the light use efficiency without using any reflection polarizing plate nor performing multiple reflection. Further, since the diffraction phenomenon is not used, it is possible to prevent color breakup.

In the planar light source device of the second aspect of the present invention, it is possible to change reflected light which is reflected by the divided prism to light containing parallel polarized light (polarized light parallel to the direction of the ridge of the divided prism 110) considerably more than vertically polarized light (polarized light perpendicular to the direction of the ridge of the divided prism 110) (in other words, it is possible to change the reflected light to light having high degree of polarization) in the light-source light guide plate which lets the light enter the light guide plate. This increases the light use efficiency without using any reflection polarizing plate nor performing multiple reflection. Further, since the diffraction phenomenon is not used, it is possible to prevent color breakup.

These and other objects, features, aspects and advantages of the present invention will become more apparent from the following detailed description of the present invention when taken in conjunction with the accompanying drawings.

BRIEF DESCRIPTION OF DRAWINGS

FIG. 14 is a view for explanation on the incident angle of reflected light 10a which is reflected by the divided prism 11, at a light exit surface of the light guide plate 3;

FIG. 15 is a graph for explanation on the reflectance of the reflected light 10a which is reflected by the divided prism 11, at an interface between the inside and the outside (air layer) of the light guide plate 3.

BEST MODE FOR CARRYING OUT THE INVENTION

Figure 1:
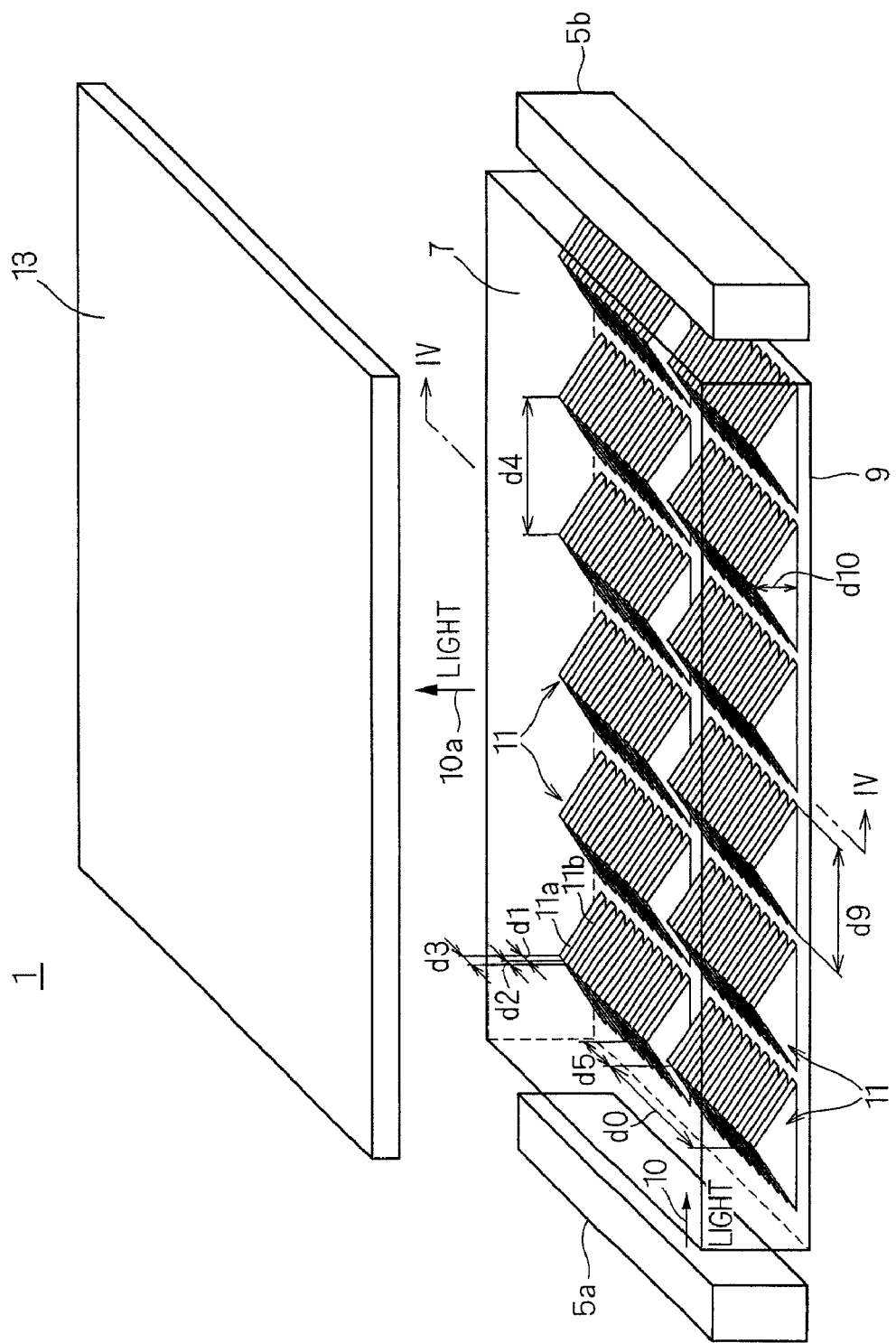
FIG. 1 is a schematic structural diagram (perspective view) showing a planar light source device 1 in accordance with a first preferred embodiment.
Figure 2:
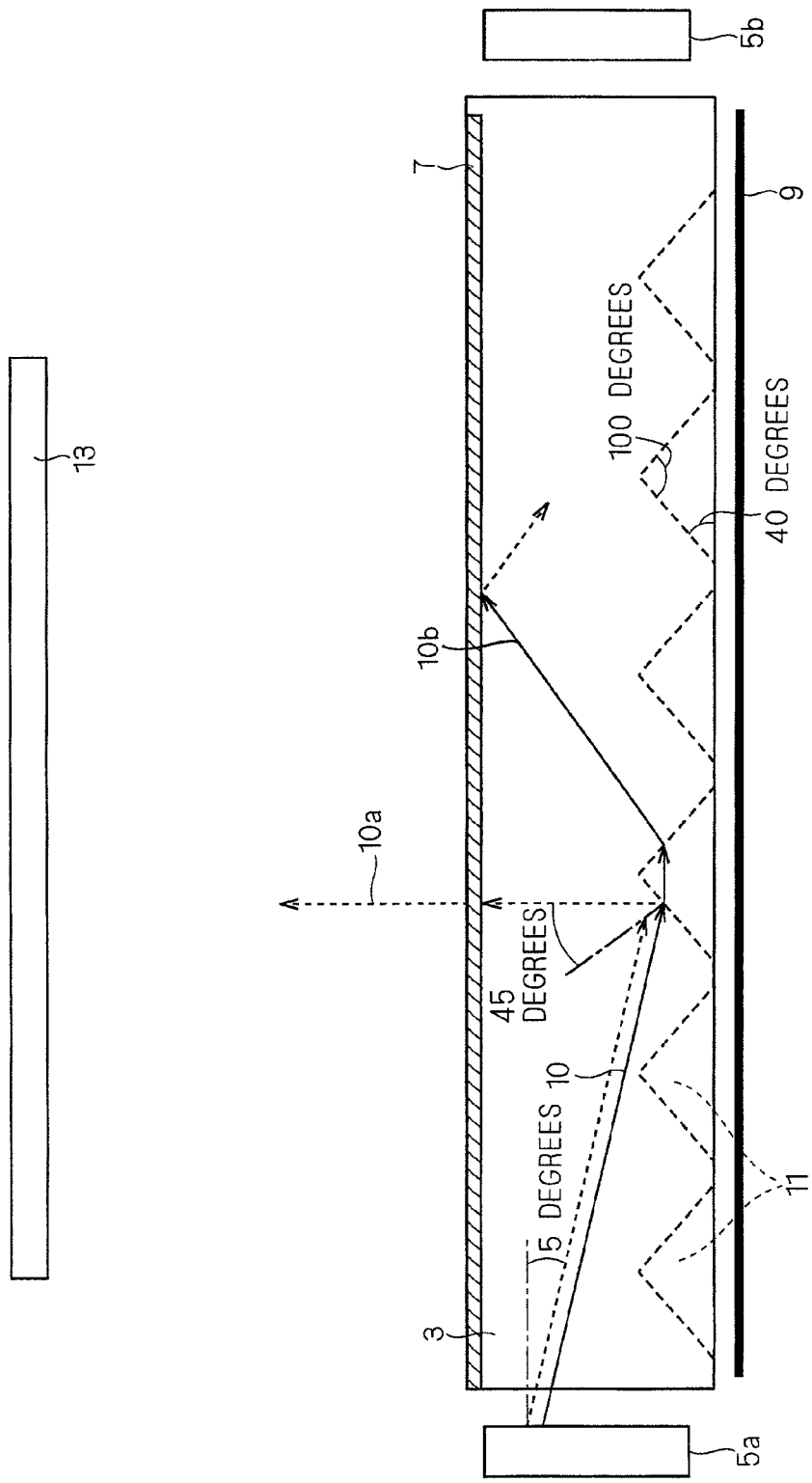
FIG. 2 is a side view showing the planar light source device 1 in accordance with the first preferred embodiment.
Figure 3:
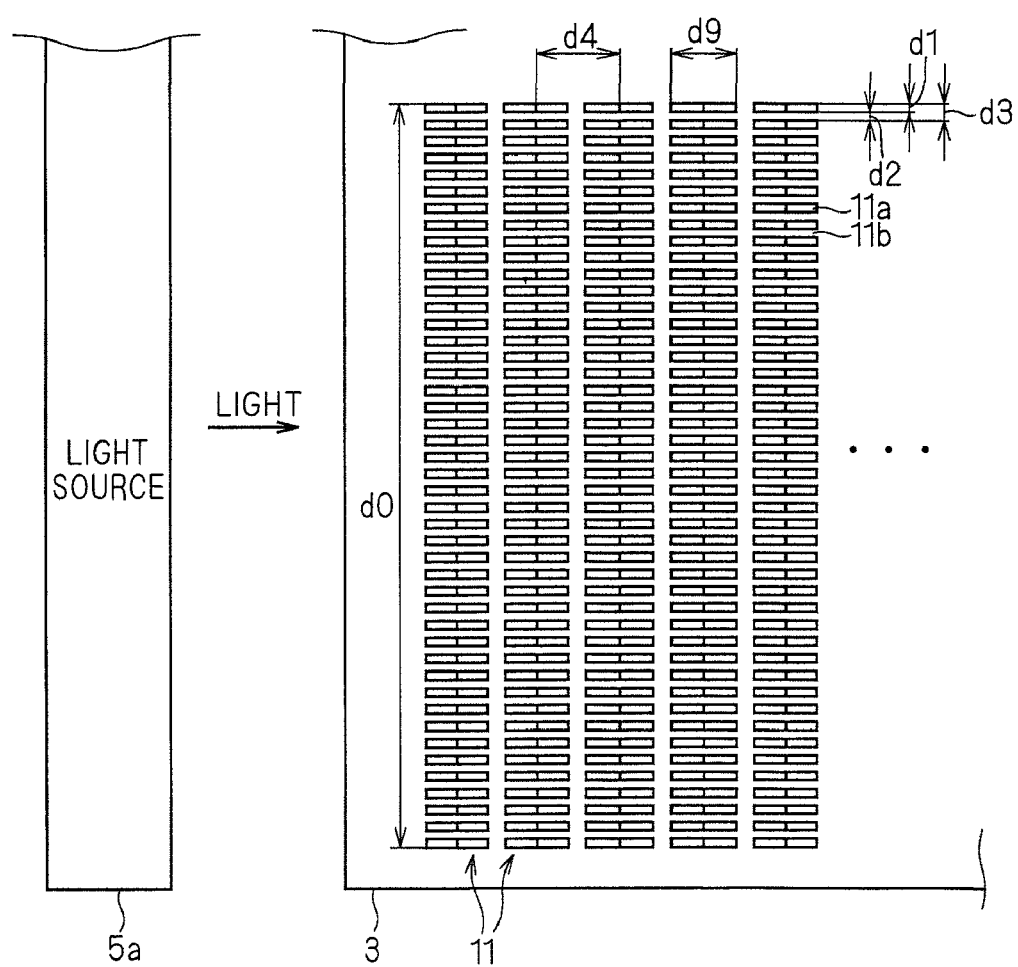
FIG. 3 is a plan view showing a light guide plate 3 of FIG. 1.
Figure 4:
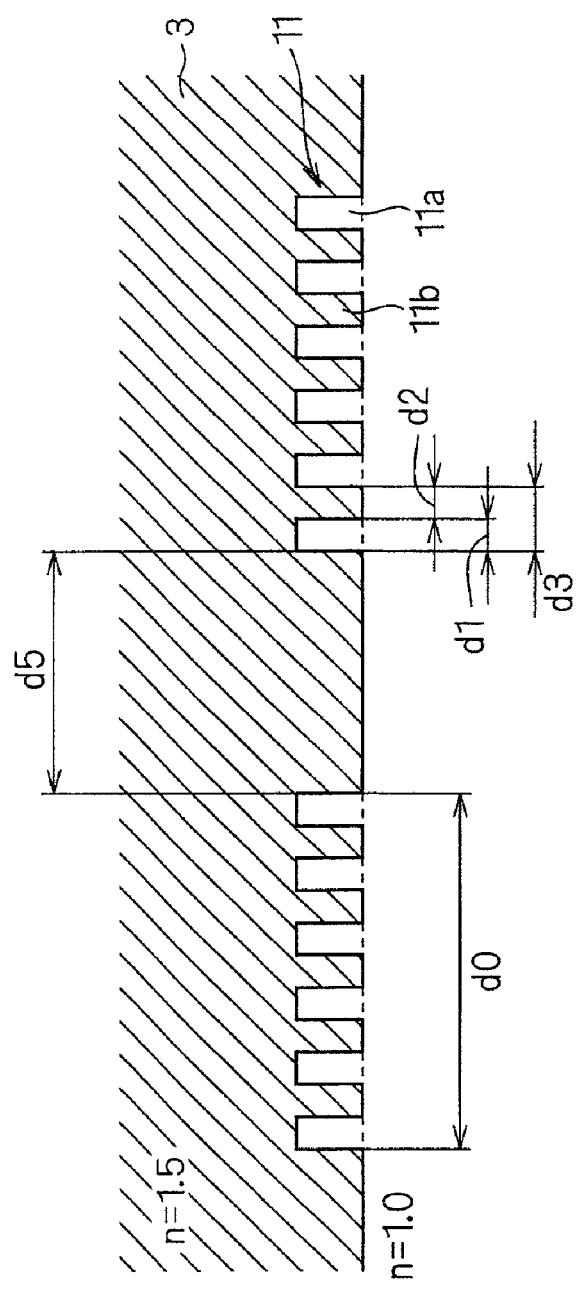
FIG. 4 is a cross section taken along the line IV-IV of the light guide plate 3 of FIG. 1.

The First Preferred Embodiment
<Overall Structure>
A planar light source device 1 of the first preferred embodiment can be used as e.g., a backlight device of a liquid crystal display, and a configuration thereof is shown in FIGS. 1 to 4. FIG. 1 is a perspective view of the planar light source device 1, FIG. 2 is a side view thereof, FIG. 3 is a plan view thereof, and FIG. 4 is a cross section taken along the line IV-IV of FIG. 1.

As shown in FIGS. 1 to 4, the planar light source device 1 comprises a light guide plate 3, light sources 5a and 5b which are so arranged to be opposed to both end surfaces (light incident surfaces) of the light guide plate 3, respectively, a phase difference plate 7 adhered to a front surface (light exit surface) of the light guide plate 3, and a reflection sheet 9 which is so arranged as to be opposed to a back surface of the light guide plate 3. A liquid crystal panel 13 of a liquid crystal display is arranged in front of the light exit surface of the light guide plate 3.

The light guide plate 3 is formed of a transparent member such as a transparent resin or the like in, e.g., a rectangular and planar shape. On the back surface inside the light guide plate 3, one or more divided prisms 11 are formed.

The divided prism 11 has a prism portion 11a and a dividing portion (i.e., part of the light guide plate 3) 11b having widths d1 and d2 both of which are almost equal to the wavelength of light from the light sources 5a and 5b, respectively, and is formed with the prism portion 11a and the dividing portion 11b alternately repeated along a direction parallel to the light incident surface of the light guide plate 3.

In more detail, for example, the divided prism 11 is an isosceles triangle pole prism, with a surface thereof on the side of the base of the isosceles triangle arranged on the back surface of the light guide plate 3, and is so formed, being divided intermittently in the direction of the ridge of the vertex angle of the isosceles triangle, as to have a structure where the prism portion 11a and the dividing portion 11b are alternately repeated. In other words, the divided prism 11 is formed as a prism aggregate in which a plurality of thin isosceles triangular prisms 11a are arranged in parallel at predetermined intervals 11b in the direction of the ridge of the vertex angle thereof, and the direction of the ridge of the vertex angle of the isosceles triangle is a direction parallel to the light incident surface of the light guide plate 3.

The prism portion 11a is formed as, e.g., a concave portion which is concavely formed in the back surface of the light guide plate 3 from the outside of the light guide plate 3 toward the inside thereof. In other words, the prism portion 11a is formed as a prism of which the inside is an air layer (having a refractive index n=1).

A plurality of divided prisms 11 are arranged, for example, in the back surface inside the light guide plate 3 longitudinally and latitudinally (in other words, in the direction of the ridge of the vertex angle and the direction orthogonal to the direction of the ridge) at appropriate intervals d4 and d5. By adjusting the interval in the direction of the ridge of the vertex angle (luminance adjusting interval) d5, the luminance of the planar light source device 1 can be adjusted.

In the divided prism 11, as an exemplary case, the total length d0 in the direction of the ridge of the vertex angle (i.e., the length in the direction of the repetition of the prism portion 11a and the dividing portion 11b) is set to range from 1 µm to 50 µm, the vertex angle is set to 100 degrees, the base angle is set to 40 degrees, the length d9 of the base of the isosceles triangle is set to 4 µm which is sufficiently longer than the wavelength of light, the width d1 of the prism portion 11a is set to 4 µm, the width d2 of the dividing portion 11b is set to 4 µm, the pitch d3 of the repetition of the prism portion 11a and the dividing portion 11b is set to 8 µm, and the height d10 of the divided prism is set to 3 µm. The pitch d4 between the ridges of the adjacent divided prisms 11 is set to 5 µm, and the luminance adjusting interval d5 is set to range from 10 µm to 100 µm.

In the planar light source device 1, as shown in FIG. 2, when the light source 5a is lighted, light 10 from the light source 5a enters the inside of the light guide plate 3 from the light incident surface of the light guide plate 3 and is propagated while being reflected by an inner surface of the light guide plate 3. At some point, the light is incident on a prism surface of the divided prism 11 and divided into reflected light 10a which is reflected by the prism surface and transmission light 10b which passes through the prism surface. At that time, as discussed later, by virtue of the presence of the dividing portions 11b of the divided prism 11, the reflected light 10a becomes light containing parallel polarized light (polarized light parallel to the direction of the ridge of the divided prism 11) more than vertically polarized light (polarized light perpendicular to the direction of the ridge of the divided prism 11).

Then, the reflected light 10a is reflected by the prism surface and exits outside from the light exit surface of the light guide plate 3. The reflected light 10a passes through the phase difference plate 7, with the polarized light thereof rotated in a predetermined direction, and is applied to the liquid crystal panel 13. When the light 10 from the light source 5a enters the light guide plate 3 with a depression angle of 5 degrees as shown in FIG. 2, for example, the reflected light 10a is reflected by the divided prism 11 at a reflection angle of 45 degrees in a direction almost perpendicular to the light exit surface of the light guide plate 3 and applied to the liquid crystal panel 13. The phase difference plate 7 is a half wave plate and adhered with its slow axis tilted by 22.5 degrees with respect to a direction parallel to the direction of the ridge of the divided prism 11, and the parallel polarized light of the reflected light 10a is changed to polarized light having an angle of 45 degrees with respect to the direction parallel to the direction of the ridge of the divided prism 11. The polarized light in this direction is polarized light of high light use efficiency for twisted nematic type liquid crystal panels.

On the other hand, the transmission light 10b passes through the divided prism 11 and is propagated while being reflected by the inner surface of the light guide plate 3 and the reflection sheet 9, and then repeats being reflected by and passing through the divided prism 11. Since the reflected light 10a contains more parallel polarized light, the transmission light 10b contains more vertically polarized light conversely. In the transmission light 10b, however, the polarization state is changed by the birefringent property of the light guide plate 3 and the phase difference plate 7 during propagation of the transmission light 10b and the decreased horizontally polarized light increases again. Thus, the transmission light 10b comes into a state close to that of natural light. Therefore, even when the transmission light 10b is reflected by the post-stage divided prism 11 again, the reflected light contains considerably more parallel polarized light.

Since the divided prism 11 has an isosceles triangular shape (in other words, is symmetrical with respect to both the light incident surfaces of the light guide plate 3), light from the light source 5b also exhibits the same behavior as that of the light from the light source 5a. Therefore, since the polarized light can be also effectively emitted from the light of the light source 5b, like the light source 5a, it is possible to achieve a high-intensity lighting with high light use efficiency.

Thus, the planar light source device 1 can emit light of high degree of polarization (light containing the light in a specific polarization state at a considerably high rate).

Though the divided prism 11 has an isosceles triangular shape since light rays enter from both the end surfaces of the light guide plate 3 in the first preferred embodiment, if light enters from only one of the end surfaces of the light guide plate 3, the divided prism 11 may have a scalene triangular shape.

The divided prism 11 is not limited to a triangle pole prism but may be a prism having a shape, for example, like a cylindrical lens. The shape of the prism is not particularly limited only if, generally, the prism has a prism surface extending parallel to the light incident surface of the light guide plate 3 and has a structure where the prism portion and the dividing portion are alternately repeated in the extending direction parallel to the light incident surface of the light guide plate 3.

The divided prisms 11 are arranged at appropriate intervals, not filling the entire back surface of the light guide plate 3. Further, it is not always necessary to regularly arrange the divided prisms 11 longitudinally and latitudinally as shown in FIG. 1.

<Reflection Simulation of Divided Prism 11>

Figure 5:
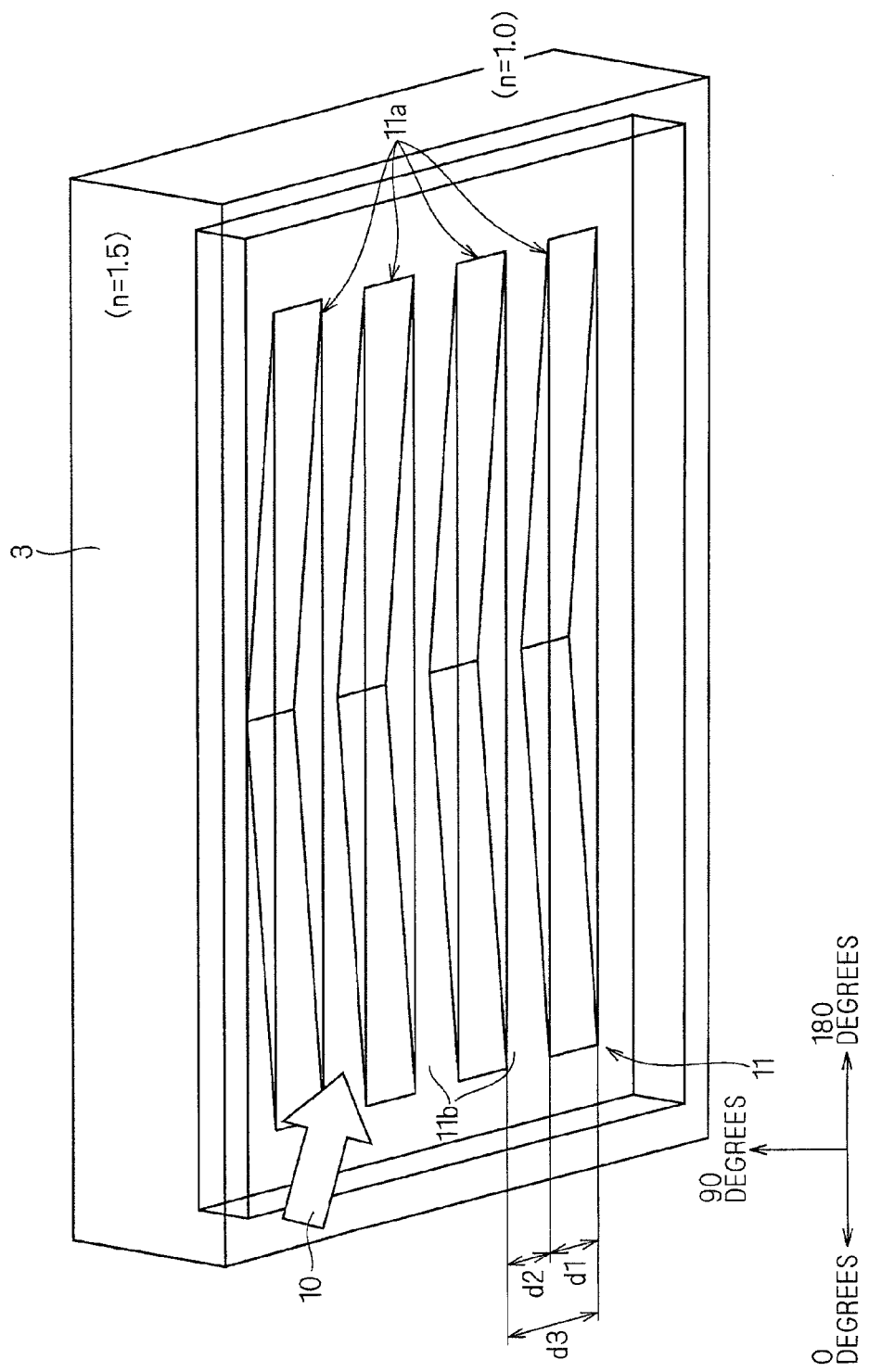
FIG. 5 is a view for explanation on a model of the light guide plate 3 used in a reflection simulation.

FIG. 5 shows a model of the light guide plate 3 used in a reflection simulation of the divided prism 11.

In this model, the refractive index n of the light guide plate 3 is set to 1.5. As to the divided prism 11, the total length d0 in the direction of the ridge of the vertex angle is set to 5 µm (d0 may take any value only if it falls in a range, e.g., from 1 µm to 50 µm) and each prism portion 11a is set as a hollow concave portion of isosceles triangular shape (having a refractive index n=1).

In FIG. 5, one of the directions perpendicular to the light incident surface of the light guide plate 3 is set to 0 degrees, the other direction is set to 180 degrees, and an upward direction orthogonal to the light exit surface of the light guide plate 3 is set to 90 degrees.

A wave optics simulation is performed, where a plane wave in a predetermined polarization state enters the light guide plate 3 from the direction of 0 degrees and the relative luminous intensity of the reflected light 10a which is reflected by the divided prism 11 (i.e., the luminous intensity of the reflected light 10a with respect to that of the incident light 10) is measured.

The simulation is performed on a case where a plane wave of parallel polarized light of which the wavelength is 0.54 μm and the oscillation direction of the electric field is a direction parallel to the direction of the ridge of the divided prism 11 enters as the incident light 10 and a case where a plane wave of vertically polarized light of which the wavelength is 0.54 μm and the oscillation direction of the electric field is a direction perpendicular to the direction of the ridge of the divided prism 11 enters.

Further, the simulation is performed on a case where the width d1 of the prism portion 11a of the divided prism 11 is 0.2 μm, the width d2 of the dividing portion 11b is 0.2 μm, and the repetition pitch d3 of these portions is 0.4 μm, a case where d1=d2=0.4 μm and d3=0.8 μm, and a case where d1=d2=0.8 μm and d3=1.6 μm.

Figure 6:
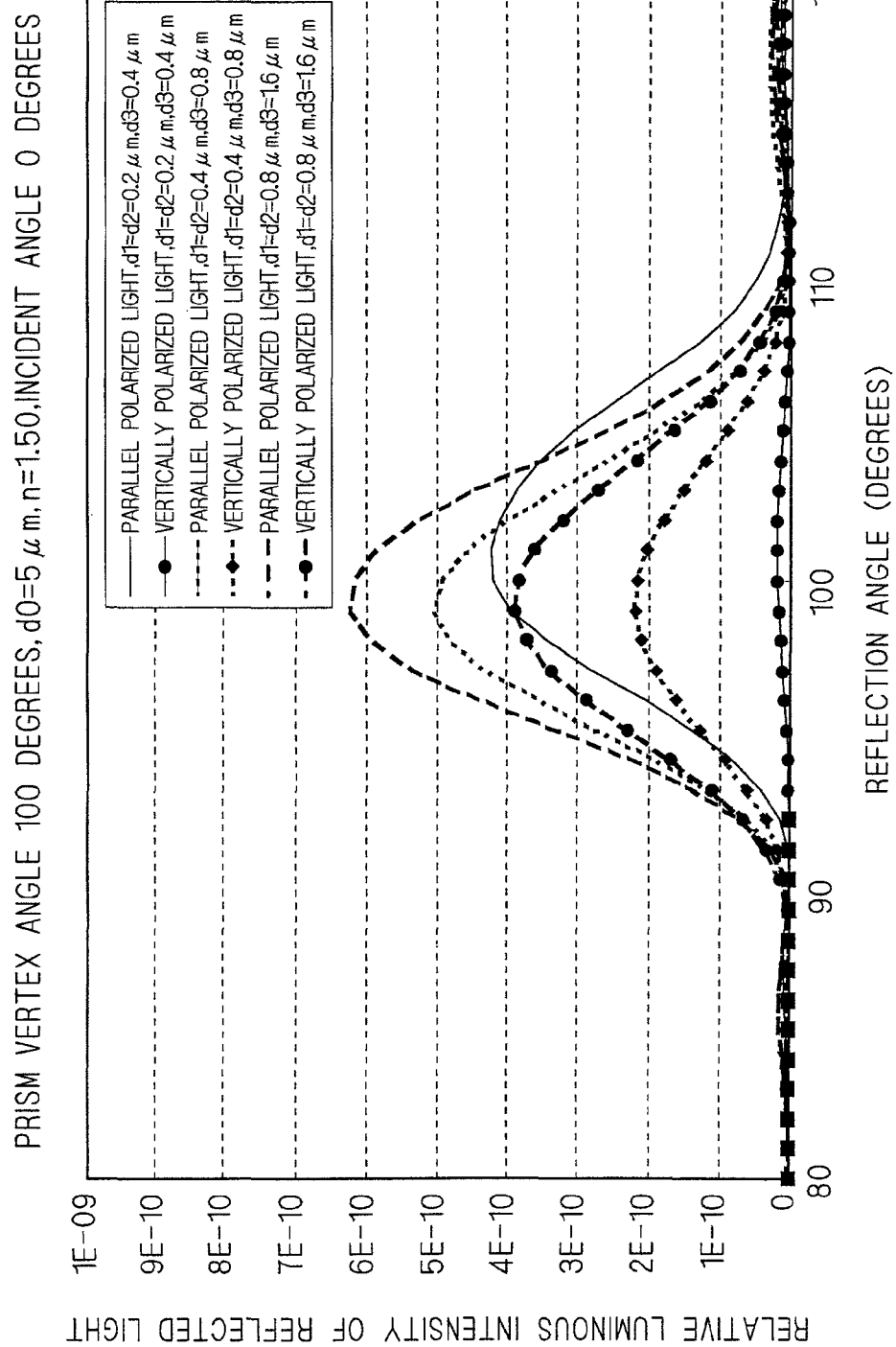
FIG. 6 is a graph showing simulation results of the cases where d1=d2=0.2 μm in a divided prism 11, where d1=d2=0.4 μm, and where d1=d2=0.8 μm.

FIG. 6 shows results of the above simulations.

It can be seen from FIG. 6 that when attention is paid to the direction where the reflection angle is 100 degrees, in any one of the cases where d1=d2=0.2 μm and d3=0.4 μm, where d1=d2=0.4 μm and d3=0.8 μm, and where d1=d2=0.8 μm and d3=1.6 μm, the relative luminous intensity (i.e., the reflectance) of the reflected light 10a is about ten to two times larger in the case where the incident light 10 is parallel polarized light than in the case where the incident light 10 is vertically polarized light. From this, it can be seen that when unpolarized light enters the light guide plate 3, the reflected light 10a which is reflected by the divided prism 11 contains parallel polarized light more than vertically polarized light.

Figure 7:
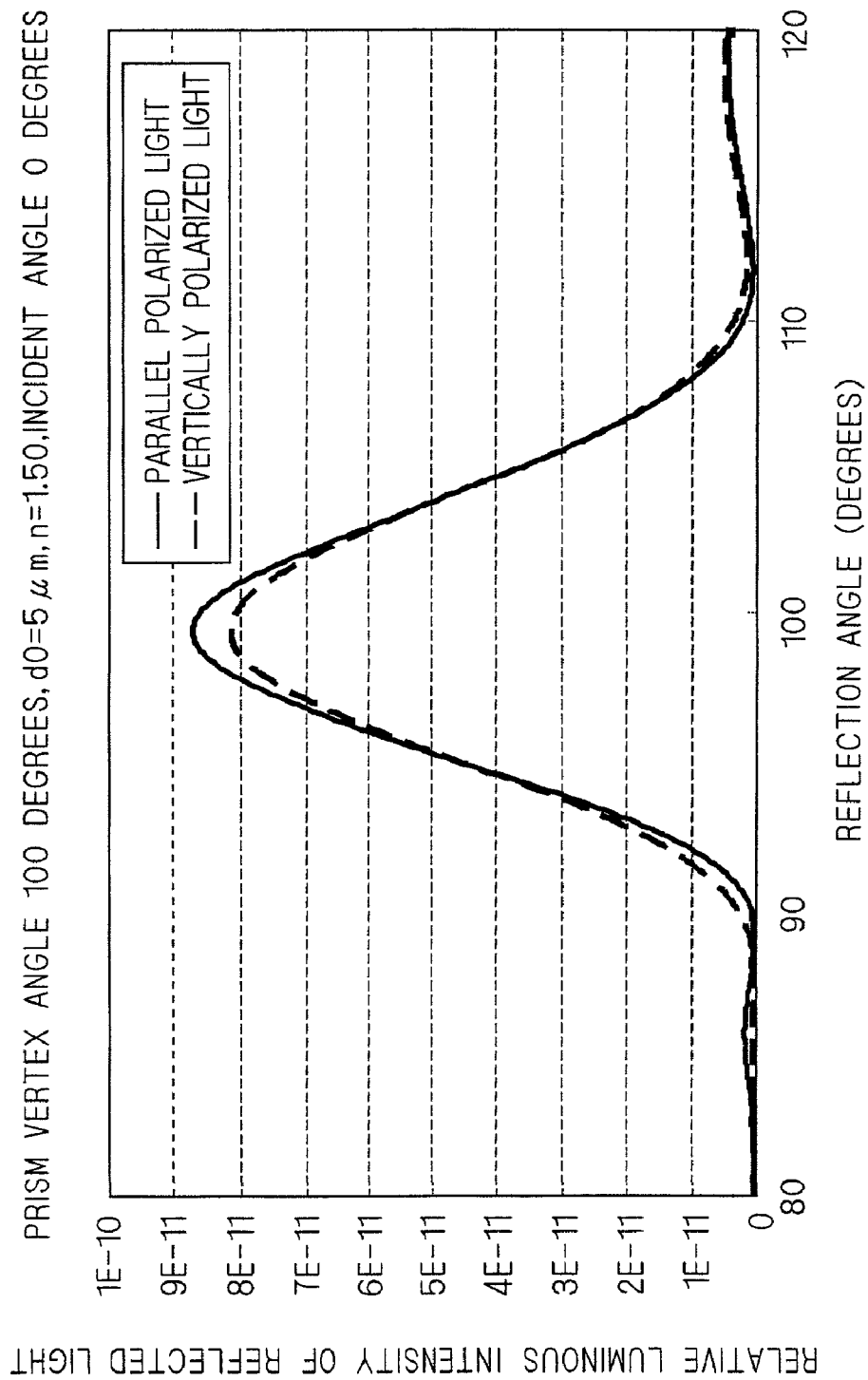
FIG. 7 is a graph showing results of the reflection simulation of a continuous prism.

FIG. 7 shows results of the same wave optics simulations as the above one, which are performed under the same condition except that a continuous isosceles triangle pole prism without any dividing portion 11b (hereinafter, referred to as "continuous prism") is used instead of the divided prism 11.

It can be seen from FIG. 7 that the relative luminous intensity of the reflected light 10a in the case where the incident light 10 is parallel polarized light is almost equal to that in the case where the incident light 10 is vertically polarized light. The reason is that in the continuous prism in which the total length d0=5 μm in the direction of the ridge is several times larger than the wavelength (=0.54 μm) of the incident light 10, since it is a normal total reflection condition, the parallel polarized light and the vertically polarized light are reflected in the same manner at any portion in the direction of the ridge (in other words, since the divided prism 11 has the dividing portion 11b of which the width d2 is close to the wavelength of the incident light 10, the vertically polarized light is harder to reflect by (in other words, can more easily pass through) the dividing portion 11b than the parallel polarized light.

From this, like in FIG. 6, it can be seen that the difference in the relative luminous intensity of the reflected light 10a between the case where the incident light 10 is parallel polarized light and the case where the incident light 10 is vertically polarized light is caused by the structure where the prism portion 11a and the dividing portion 11b of which the respective widths d1 and d2 are close to the wavelength of the incident light are repeated.

FIG. 6 also shows results of the simulations on the case (A) where d1=d2=0.2 μm and d3=0.4 μm and the case (B) where d1=d2=0.8 μm and d3=1.6 μm. From these results, it is found that the ratio of the relative luminous intensity of the reflected light 10a in the case of the parallel polarized light to that in the case of the vertically polarized light is about 100 in the above case (A) and about 1.5 in the above case (B). From this, it can be seen that by setting the width d1 of the prism portion 11a, the width d2 of the dividing portion 11b, and the repetition pitch d3 of these portions to values smaller than those in the above case (B), the reflected light 10a can become the light containing the parallel polarized light considerably more than the vertically polarized light (in other words, the light with high degree of polarization).

Thus, there is a tendency that by setting the repetition pitch d3 of the prism portion 11a and the dividing portion 11b to a smaller value, the degree of polarization of the reflected light 10a can be considerably increased. The tendency can be made remarkable by setting the repetition pitch d3 to a small value equal to or less than the wavelength of the incident light (visible light) 10. When the repetition pitch d3 is 0.4 μm, the above ratio is about 100, which is sufficiently large in practical application. If the repetition pitch d3 is set to be smaller than 0.2 μm, it becomes difficult to form the divided prism 11, and therefore setting of the repetition pitch d3 to be not smaller than 0.2 μm is practically useful.

The reason why the relative luminous intensity of the reflected light 10a decreases when the repetition pitch d3 is set smaller in FIG. 6 is thought that more transmission light 10b passes through the divided prism 11.

Figure 8:
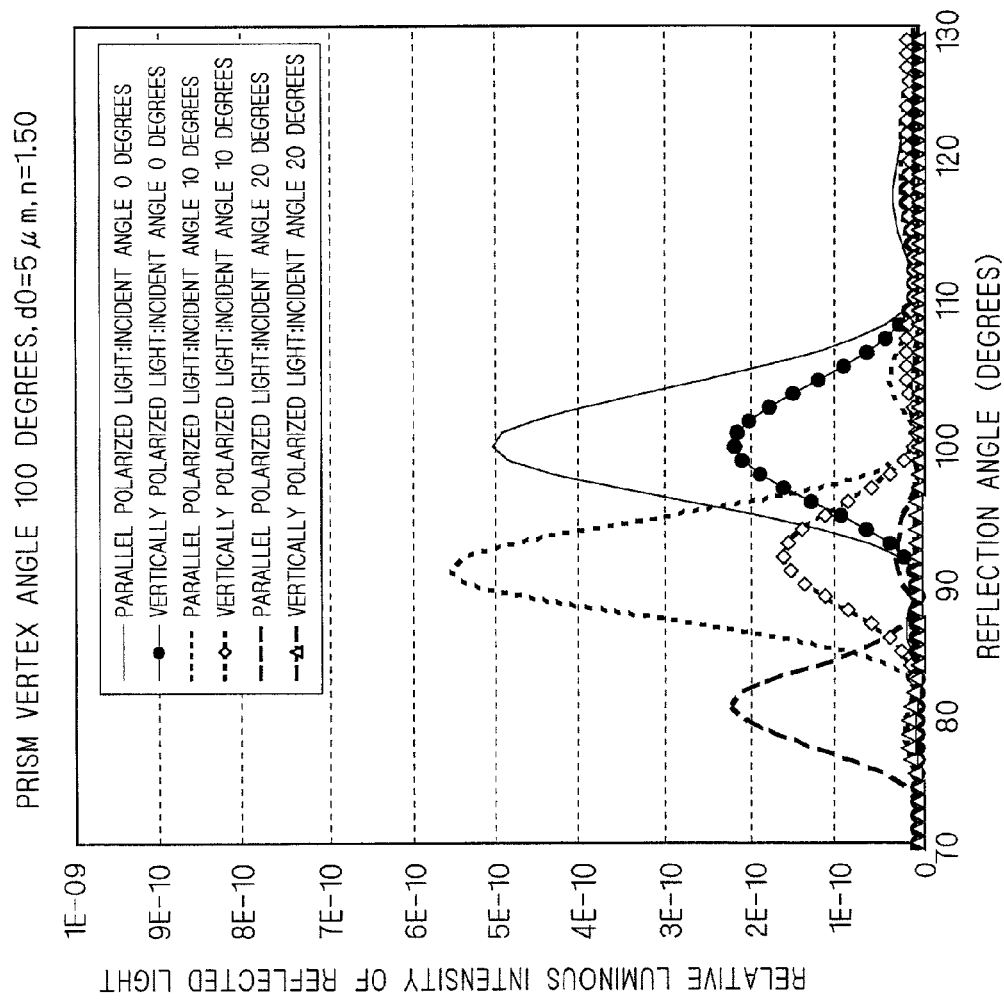
FIG. 8 is a graph showing simulation results of the cases where the incident angle of incident light is 10 degrees, 20 degrees, and 30 degrees in the divided prism 11.

FIG. 8 shows results of the same simulation as the above one, which is performed on a case where in the divided prism 11, the width d1 of the prism portion 11a is set to 0.4 μm, the width d2 of the dividing portion 11b is set to 0.4 μm, and the repetition pitch d3 of these portions is set to 0.8 μm, the vertex angle is set to 100 degrees, the total length d0 in the direction of the ridge of the vertex angle is set to 5 μm, and the incident angle of the incident light 10 is set to 0 degrees, 10 degrees, and 20 degrees.

From FIG. 8, it can be seen that the reflection angle of the reflected light 10a is changed to 80 degrees when the incident angle of the incident light 10 is 20 degrees and changed to 90 degrees when the incident angle of the incident light 10 is 10 degrees, but the ratio of the relative luminous intensity of the reflected light 10a in the case of the parallel polarized light to that in the case of the vertically polarized light is twice or more in any one of the cases.

Figure 9:
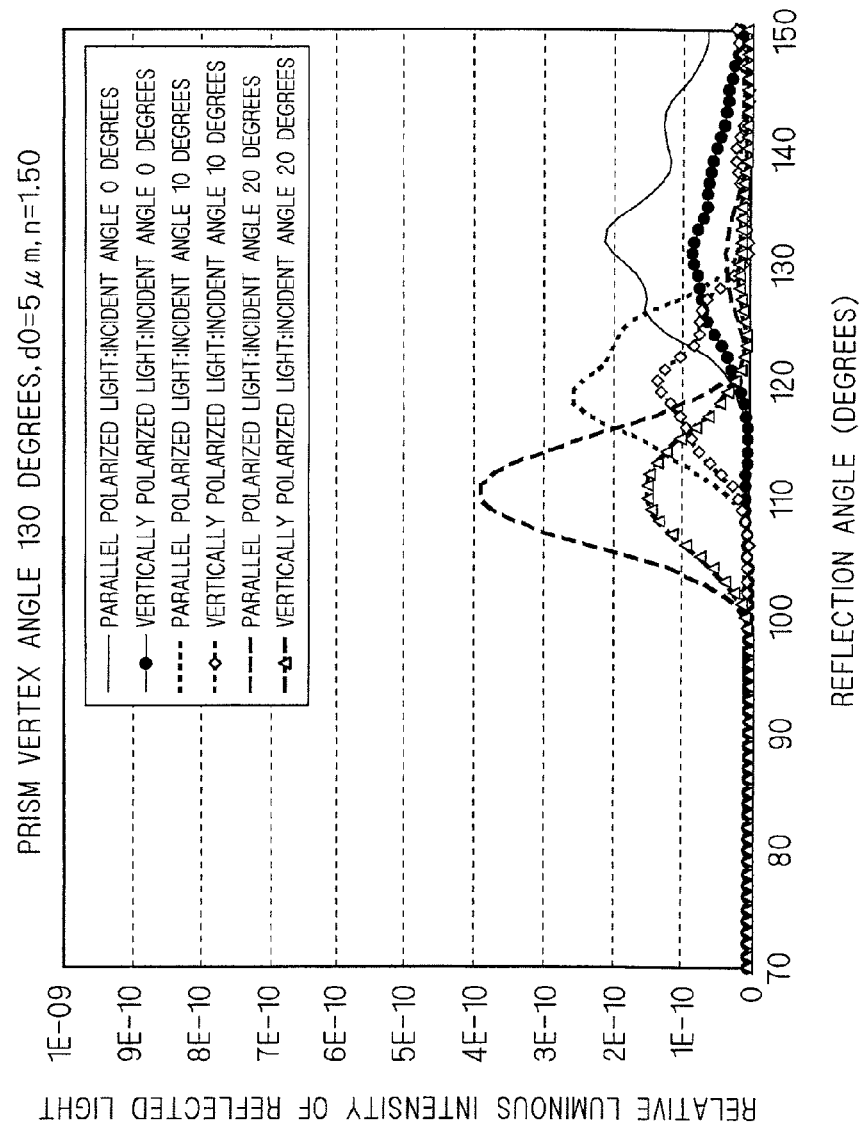
FIG. 9 is a graph showing simulation results of the cases where the incident angle of incident light is 10 degrees, 20 degrees, and 30 degrees when the vertex angle of the divided prism 11 is an obtuse angle (130 degrees)

FIG. 9 shows results of the same simulation as the above one, which is performed on a case where in the divided prism 11, the width d1 of the prism portion 11a is set to 0.4 μm, the width d2 of the dividing portion 11b is set to 0.4 μm, and the repetition pitch d3 of these portions is set to 0.8 μm, the vertex angle is set to 130 degrees, the total length d0 in the direction of the ridge of the vertex angle is set to 5 μm, and the incident angle of the incident light 10 is set to 0 degrees, 10 degrees, and 20 degrees. Also in these results, the reflection angle of the reflected light 10a is changed to 130 degrees, 120 degrees, and 100 degrees, but the ratio of the relative luminous intensity of the reflected light 10a in the case of the parallel polarized light to that in the case of the vertically polarized light is twice or more in any one of the cases.

From the above simulation results, it can be seen that regardless of the degree of vertex angle of the divided prism 11, by setting the width d1 of the prism portion 11a, the width d2 of the dividing portion 11b, and the repetition pitch d3 of these portions to be smaller than, e.g., d1=d2=0.8 μm and d3=1.6 μm, the reflected light 10a which is reflected by the divided prism 11 can become the light with high degree of polarization.

<Main Effect>

In the planar light source device 1 having the above configuration, since the divided prism 11 has the prism portion 11a and the dividing portion 11b both of which have a width equal to or less than the wavelength of light from the light sources 5a and 5b and is formed with the prism portion 11a and the dividing portion 11b alternately repeated along the direction parallel to the end surfaces of the light guide plate 3 which are opposed to the light sources 5a and 5b, it is possible to change the reflected light 10a which is reflected by the divided prism 11 to the light containing the parallel polarized light having the oscillation direction of the electric field in a direction parallel to the direction of the ridge of the divided prism 11 more than the vertically polarized light having the oscillation direction of the electric field in a direction perpendicular to the direction of the ridge of the divided prism 11 (in other words, it is possible to change the reflected light to the light having high degree of polarization). This increases the light use efficiency without using any reflection polarizing plate nor performing multiple reflection. Further, since the diffraction phenomenon is not used, it is possible to prevent color breakup.

Since the prism portion 11a of the divided prism 11 is a concave portion which is concavely provided in the back surface of the light guide plate 3, there is no risk of damage caused by contact between any other member and the light guide plate and the divided prism 11 can be provided inside the light guide plate 3 in a stable structure.

Since the divided prism 11 is an isosceles triangle pole prism, with a surface thereof on the side of the base of the isosceles triangle arranged on the back surface of the light guide plate 3, and has a structure where the prism portion 11a and the dividing portion 11b are alternately repeated in the direction of the ridge of the vertex angle of the isosceles triangle, in other words, since the divided prism 11 is formed symmetrically with respect to both the end surfaces of the light guide plate 3, it is possible to reflect the light rays from the end surfaces on both the sides of the light guide plate 3 toward the front surface side of the light guide plate 3 as the light with effectively high degree of polarization.

If the light rays from the light sources 5a and 5b are visible light, since the respective widths of the prism portion 11a and the dividing portion 11b of the divided prism 11 are each not larger than 0.8 μm, it is possible to effectively produce the effect of the divided prism 11 in the case where the light from the light source is visible light.

Since the length d0 in the direction of the repetition of the prism portion 11a and the dividing portion 11b in the divided prism 11 ranges from 1 μm to 50 μm, it is possible to produce the effect of the divided prism 11 without any problem of the scatter of light caused by the diffraction.

The Second Preferred Embodiment

In the second preferred embodiment, discussion will be made on a divided prism mold used for forming the divided prism 11 of the first preferred embodiment and a method of manufacturing the divided prism mold.

<Description on Divided Prism Mold>

Figure 10:
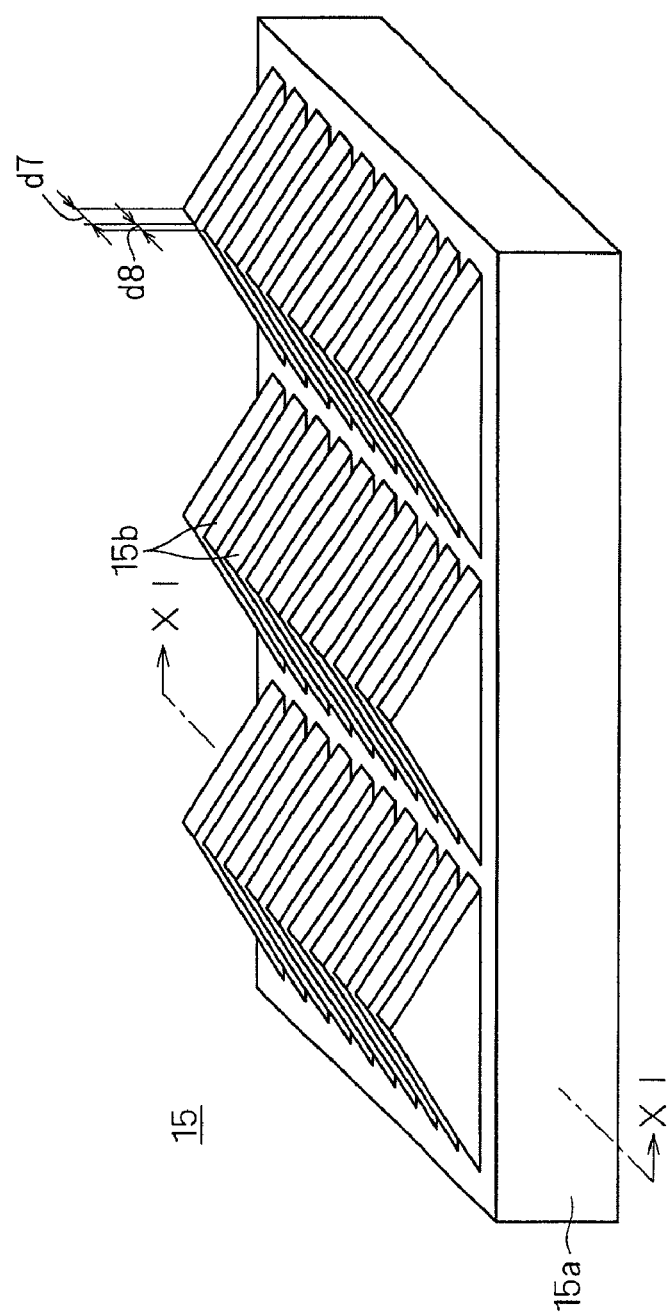
FIG. 10 is a schematic structural diagram (perspective view) showing a divided prism mold 15.
Figure 11:
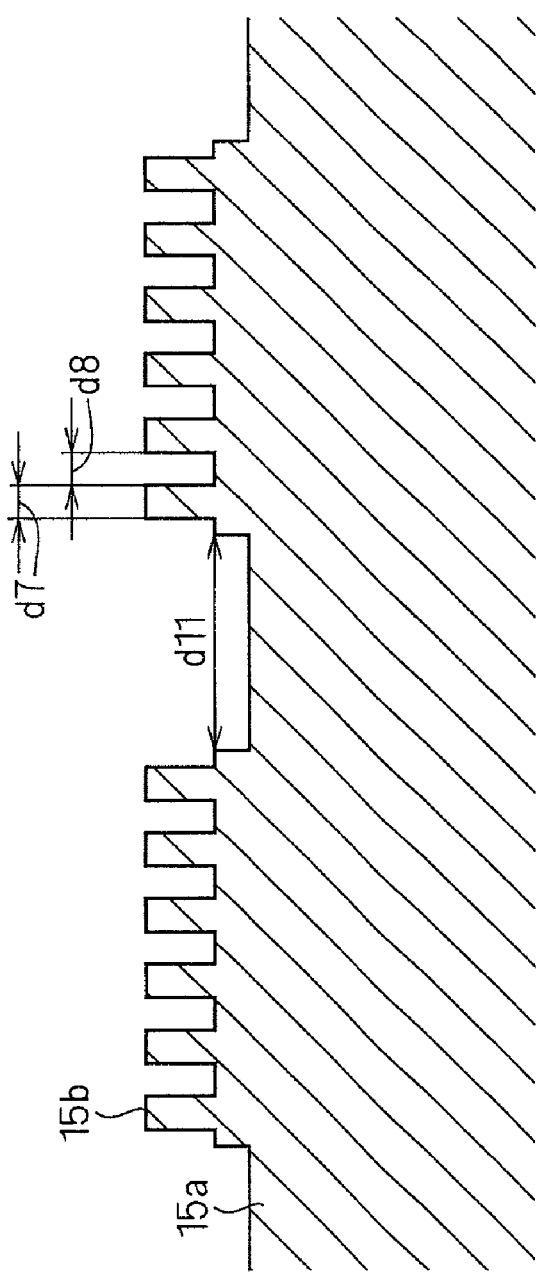
FIG. 11 is a schematic cross section taken along the line XI-XI of FIG. 10.

FIGS. 10 and 11 are views each showing a configuration of a divided prism mold 15. FIG. 10 is a perspective view showing the divided prism mold 15, and FIG. 11 is a cross section taken along the line XI-XI of FIG. 10. As shown in FIGS. 10 and 11, the divided prism mold 15 has a configuration where on a bottom-surface mold portion 15a used for forming the bottom surface of the light guide plate 3, a plurality of prism mold portions 15b used for forming the prism portion 11a of the divided prism 11 are formed longitudinally and latitudinally in a projecting manner.

Each of the prism mold portions 15b is so formed as to have the same size and shape (herein, thin isosceles triangle pole) as those of the prism portion 11a of the divided prism 11 and the prism mold portions 15b are arranged on the bottom-surface mold portion 15a in the same arrangement as that of the prism portions 11a. Herein, as to the width d7 of the prism mold portion 15b and the interval d8 between adjacent prism mold portions 15b, for example, it is set that d7=d8=0.8 μm. The interval d11 in FIG. 11 corresponds to the luminance adjusting interval d5 between adjacent divided prisms.

As methods for forming the divided prisms 11 in the light guide plate 3 by using the divided prism mold 15, injection molding, thermal transfer, and optical transfer can be used.

In the injection molding, a mold (not shown) for forming an upper surface and side surfaces of the light guide plate 3 and the divided prism mold 15 are assembled and a transparent resin in a melting state is injected into the inside of the assembled molds and cured, whereby the light guide plate 3 is formed of the transparent resin and the divided prisms 11 are formed as concave portions in the back surface of the light guide plate 3.

In the thermal transfer, by pressing the heated divided prism mold 15 to the back surface of the light guide plate 3 formed of thermoplastic transparent resin, the divided prisms 11 are formed as concave portions in the back surface of the light guide plate 3 formed of transparent resin.

In the optical transfer, an ultraviolet curing resin is applied onto the back surface of the light guide plate 3 formed of transparent resin, the projections and depressions of the prism mold portions 15b of the divided prism mold 15 are pressed thereto to be transferred thereonto, and then the ultraviolet curing resin is cured by ultraviolet rays, whereby the divided prisms 11 are formed as concave portions in the back surface of the light guide plate 3.

Alternatively, an ultraviolet curing resin film is applied onto a surface of a transparent film, the projections and depressions of the prism mold portions 15b of the divided prism mold 15 are pressed thereto to be transferred thereonto, the ultraviolet curing resin is cured by ultraviolet rays, and then the transparent film with the cured resin is adhered to the back surface of the light guide plate 3, whereby the divided prisms 11 are formed as concave portions.

<Discussion on Method of Manufacturing Divided Prism Mold 15>

Figure 12:
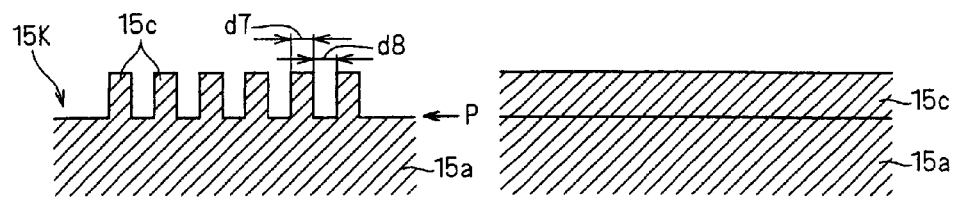
FIG. 12 shows a method of manufacturing the divided prism mold, and in FIGS. 12(a) to 12(d), the views on the right side are side views viewed from the P direction of the views on the left side.
Figure 12:
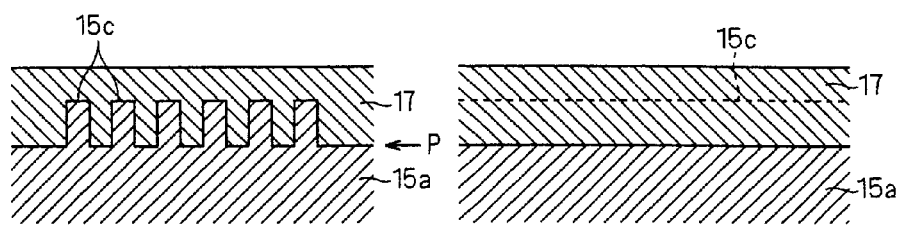
Figure 12:
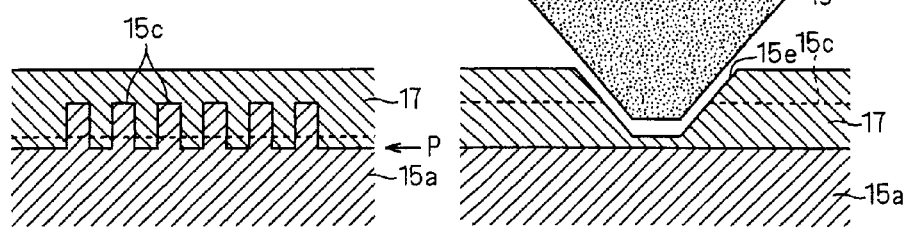
Figure 12:
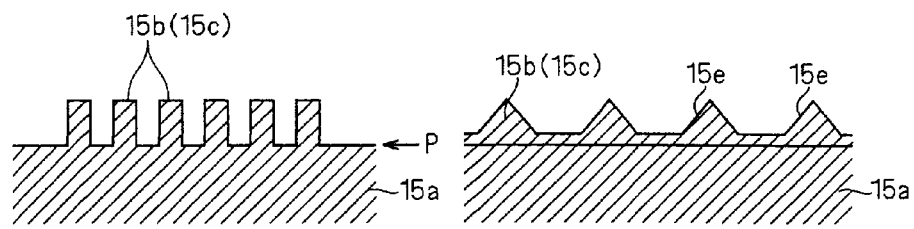

First, as shown in FIG. 12(a), by using, e.g., a quartz substrate mold with a line-and-space pattern, formed is a base mold 15K in which a plurality of parallel linear ridge portions 15c are formed on the bottom-surface mold portion 15a in a line-and-space manner at predetermined intervals by electroforming. The above quartz substrate mold is formed by forming a projection-depression pattern of the base mold 15K on a surface of a quartz substrate by e.g., exposure and forming a conductive film on the surface.

Each of the ridge portions 15c is a portion to finally become the prism mold portion 15b, and herein, as to the width d7 thereof and the interval d8 between adjacent ones, for example, it is set that d7=d8=0.8 μm.

Then, as shown in FIG. 12(b), a protective agent 17 is so applied onto the base mold 15K as to coat the plurality of ridge portions 15c and cured.

As shown in FIG. 12(c), the line and space on the base mold 15K is cut away together with the applied protective agent 17 by cutting using a cutting jig 19, whereby a plurality of trough portions 15e are formed in the surface. The trough portions 15e each have an inverted triangular cross section or an inverted trapezoidal cross section and are formed at such a depth as to reach near a surface of the bottom-surface mold portion 15a, linearly extending in a direction orthogonal to the ridge portions 15c. The ridge portions 15c are thereby formed in a sawlike manner where isosceles triangles are aligned in a row and each of the isosceles triangles becomes the prism mold portion 15b.

Then, as shown in FIG. 12(d), the protective agent 17 is removed. The divided prism mold 15 is thereby formed from the base mold 15K.

In the above-discussed method of manufacturing the divided prism mold, since the electroforming method and the cutting process are used to manufacture the divided prism mold 15, the divided prism mold 15 can be manufactured by using well-known techniques at low cost.

It is important that the depth of the trough portion 15e is shallower than that of the ridge portion 15c. When the dividing reflection prism of the light guide plate is manufactured by using the completed divided prism mold 15, since no groove which reflects non-polarized light is formed, excellent polarized light reflection properties can be achieved.

The Third Preferred Embodiment

Figure 13:
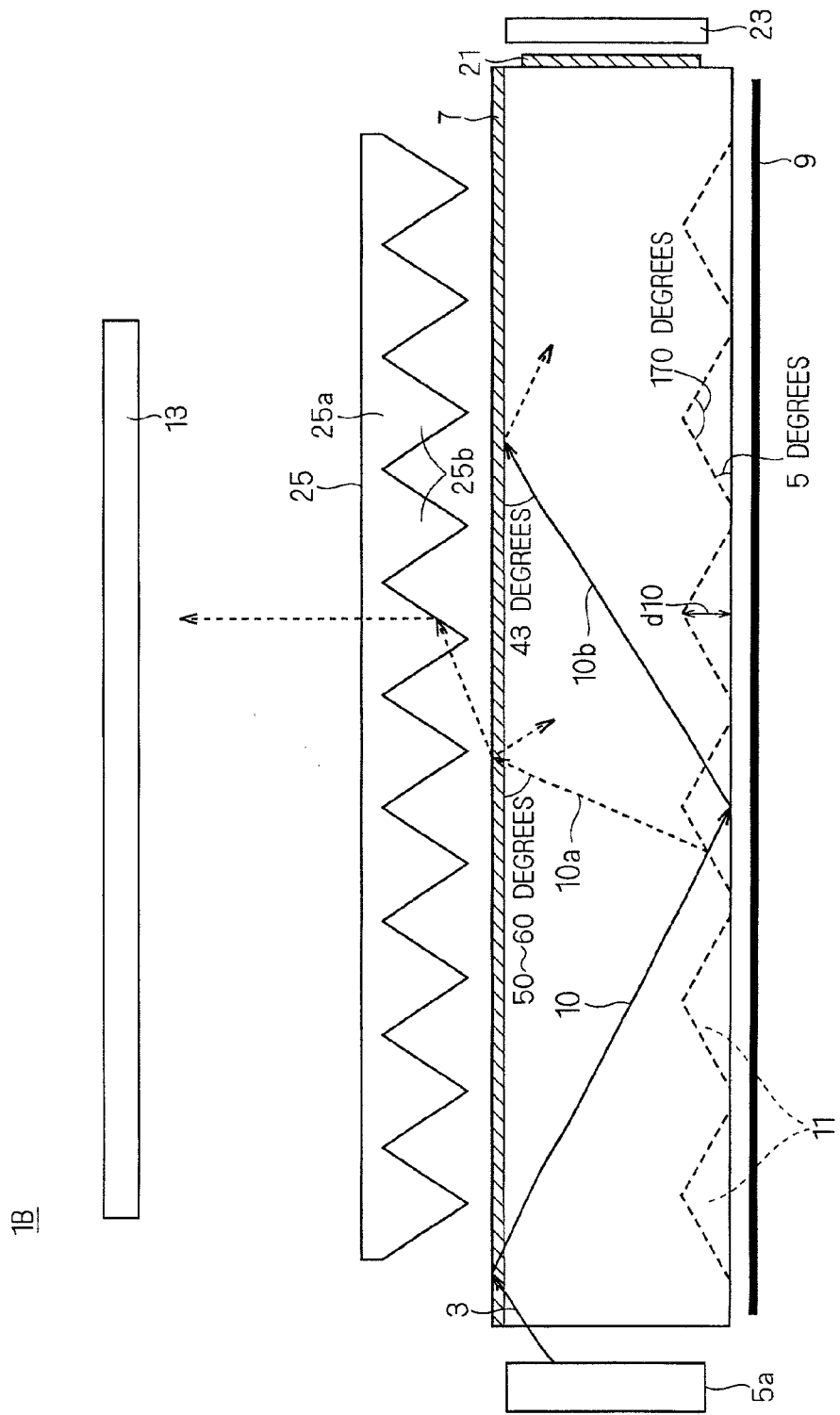
FIG. 13 is a side view showing a planar light source device 1B in accordance with a third preferred embodiment.

A planar light source device 1B of the third preferred embodiment is a variation of the first preferred embodiment, and as shown in FIG. 13, the planar light source device 1B comprises the light guide plate 3, the light source 5a which is so arranged to be opposed to one of the end surfaces (light incident surface) of the light guide plate 3, the phase difference plate 7 provided on the front surface (light exit surface) of the light guide plate 3, and the reflection sheet 9 which is so arranged as to be opposed to the back surface of the light guide plate 3, a phase difference plate 21 provided on a side surface (reflection surface) opposite to the light incident surface side of the light guide plate 3, a reflection plate 23 opposed to the reflection surface of the light guide plate 3 with the phase difference plate 21 interposed therebetween, and a reverse prism sheet 25 opposed to the light exit surface of the light guide plate 3 with the phase difference plate 7 interposed therebetween. The liquid crystal panel 13 of a liquid crystal display is arranged in front of the light exit surface of the light guide plate 3.

Like in the first preferred embodiment, the light guide plate 3 is formed of a transparent member such as a transparent resin or the like in, e.g., a rectangular and planar shape. On the back surface inside the light guide plate 3, one or more divided prisms 11 are formed.

The divided prism 11 is so formed as to have the same structure as that of the divided prism 11 of the first preferred embodiment except that the vertex angle of the isosceles triangle is set to an obtuse angle, e.g., ranging from 160 degrees to 175 degrees (herein, 170 degrees). Herein, the height d10 of the divided prism 11 is set to, e.g., 0.22 μm.

The phase difference plate 7 is adhered with its slow axis tilted by 45 degrees with respect to the light incident surface of the light guide plate 3 and has a function of a half wave plate with respect to light which is diagonally incident from the divided prism 11 at an angle ranging from about 50 to 60 degrees. Light diagonally enters the phase difference plate 7 and passes therethrough, and the phase difference plate 7 rotates the direction of the polarization of the light at 90 degrees and lets the light go therethrough.

The phase difference plate 21 is a quarter wave plate arranged with its slow axis tilted by 45 degrees with respect to the direction of the normal of a light radiation surface of the light guide plate 3. The phase difference plate 21 converts linearly polarized light (circularly polarized light) passing therethrough into circularly polarized light (linearly polarized light) and lets the light go therethrough.

The reverse prism sheet 25 has a structure where a plurality of prisms 25b are formed on a back surface (the surface facing the light guide plate 3) of a sheet portion 25a formed of a transparent member in a sheet-like manner.

The plurality of prisms 25b are formed at predetermined intervals, each extending in parallel with the light incident surface of the light guide plate 3. Each of the prisms 25b has e.g., an isosceles triangle pole shape and is formed so that a surface thereof on the side of the base of the isosceles triangle may be provided on the back surface of the sheet portion 25a (therefore, the side of the vertex angle of the isosceles triangle faces the side of the light guide plate 3) and the direction of the ridge of the vertex angle of the isosceles triangle may be parallel to the light incident surface of the light guide plate 3.

In the planar light source device 1B, as shown in FIG. 13, when the light source 5a is lighted, the light 10 from the light source 5a enters the inside of the light guide plate 3 from the light incident surface of the light guide plate 3 and is propagated while being reflected by the inner surface of the light guide plate 3. At some point, the light is incident on the prism surface of the divided prism 11 and divided into the reflected light 10a which is reflected by the prism surface and the transmission light 10b which passes through the prism surface. At that time, like in the first preferred embodiment, by virtue of the presence of the dividing portions 11b of the divided prism 11, the reflected light 10a becomes light containing the parallel polarized light having the oscillation direction of the electric field in a direction parallel to the direction of the ridge of the divided prism 11 considerably more than vertically polarized light having the oscillation direction of the electric field in a direction perpendicular to the direction of the ridge of the divided prism 11.

Then, the reflected light 10a exits outside from the light exit surface of the light guide plate 3 and passes through the phase difference plate 7, with the direction of the polarization thereof rotated at 90 degrees (therefore, the reflected light 10a is converted into light containing the vertically polarized light considerably more than the parallel polarized light). Then, the reflected light 10a passes through the reverse prism sheet 25, being refracted in a front direction of the light exit surface of the light guide plate 3, and is applied to the liquid crystal panel 13.

FIG. 15 is a graph showing the reflectance of reflected light 10a which is reflected by the divided prism 11, at an interface between the inside and the outside (air layer) of the light guide plate 3. As can be seen from FIG. 15, when the reflected light 10a is propagated from the inside to the outside (air layer) of the light guide plate 3, the reflectance of the parallel polarized light is higher than that of the vertically polarized light at the interface between the inside and the outside (in other words, the vertically polarized light can more easily pass therethrough than the parallel polarized light). Since the reflected light 10a which is reflected by the divided prism 11 contains the parallel polarized light considerably more than the vertically polarized light, as discussed above, the phase difference plate 7 rotates the direction of the polarization of the reflected light at 90 degrees so as to convert the reflected light 10a into the light containing the vertically polarized light considerably more than the parallel polarized light, whereby the transmittance of the reflected light 10a from the inside to the outside of the light guide plate 3 can be increased.

Since the vertex angle of the divided prism 11 is an obtuse angle (a prism surface 10c has a gentle slope) herein, however, the incident angle of the reflected light 10a which is reflected by the prism surface 10c with respect to the light exit surface (i.e., the phase difference plate 7) of the light guide plate 3 is relatively large. For example, as shown in FIG. 14, if the incident angle of the incident light 10 is 45 degrees, when the incident light 10 is reflected once by the light exit surface of the light guide plate 3 and after that, the incident light 10 is reflected by the divided prism 11 and enters the light exit surface of the light guide plate 3 again, the incident angle becomes 35 degrees. Therefore, the exit angle of the reflected light 10*a* from the light guide plate 3 to the outside is relatively large (in other words, it is difficult that the reflected light 10*a* goes out in the front direction of the light exit surface of the light guide plate 3). Therefore, as shown in FIG. 13, the reflected light 10*a* going out from the light guide plate 3 is refracted by the reverse prism sheet 25 and thereby goes out in the front direction of the light exit surface of the light guide plate 3.

On the other hand, the transmission light 10*b* passes through the divided prism 11 and is propagated while being reflected by the inner surface of the light guide plate 3 and the reflection sheet 9. Then, the transmission light 10*b* passes through the other end surface of the light guide plate 3 and the phase difference plate 21 and is reflected by the reflection plate 23, and then is propagated inside the light guide plate 3 again. At that time, the polarization state of the transmission light 10*b* is changed by the birefringent property of the phase difference plate 21 and the light guide plate 3 and the parallel polarized light is increased again.

Then, the transmission light 10*b* reflected by the reflection plate 23 is propagated, exhibiting the same behavior as that of the incident light 10, since the divided prism 11 has an isosceles triangular shape. It is thereby possible also for the transmission light 10*b* to effectively exit from the light exit surface of the light guide plate 3.

Thus, in the planar light source device 1B, like in the first preferred embodiment, the light with high degree of polarization (the light containing the light in a specific polarization state at a considerably high rate) can be emitted.

In the planar light source device 1B having the above configuration, since the phase difference plate 7 which rotates the direction of the polarization of the light going out from the front surface of the light guide plate 3 at 90 degrees is provided on the front surface of the light guide plate 3, it is possible to change the exit light which exits from the front surface (i.e., the inside) of the light guide plate 3 to the outside (i.e., air layer) to the light containing the vertically polarized light having the oscillation direction of the electric field in a direction perpendicular to the direction of the ridge of the divided prism 11 more than the parallel polarized light having the oscillation direction of the electric field in a direction parallel to the direction of the ridge of the divided prism 11. This increases the transmittance of the light at the interface between the inside and the outside (air layer) of the light guide plate 3.

Further, since the vertex angle of the divided prism 11 is an obtuse angle ranging from 160 degrees to 175 degrees, the height d10 of the divided prism 11 can be set lower (shallower) with respect to the total length d0 of the divided prism and this makes it easier to manufacture the divided prism mold 15 and form the divided prisms 11 in the light guide plate 3.

Further, since the reverse prism sheet which has a plurality of prisms extending in a direction parallel to the end surface (light incident surface) of the light guide plate 3 which is opposed to the light source 5*a* on a surface thereof facing the light guide plate 3 and refracts the exit light from the front surface (light exit surface) of the light guide plate 3 in the front direction of the front surface of the light guide plate 3 is so arranged as to be opposed to the front surface side of the light guide plate 3, it is possible to propagate the exit light from the front surface of the light guide plate 3 in the front direction of the front surface of the light guide plate 3 even if the exit light is deflected leftward or rightward.

Since the quarter wave plate 21 and the reflection plate 23 are provided in this order on the side of the other end surface (the surface opposite to the light incident surface) of the light guide plate 3, the light from the light source 5*a* which reaches the other end surface of the light guide plate 3 can be converted into light containing more parallel polarized light and reflected by the quarter wave plate 21 and the reflection plate 23, and this increases the light reusability.

The Fourth Preferred Embodiment

Figure 16:
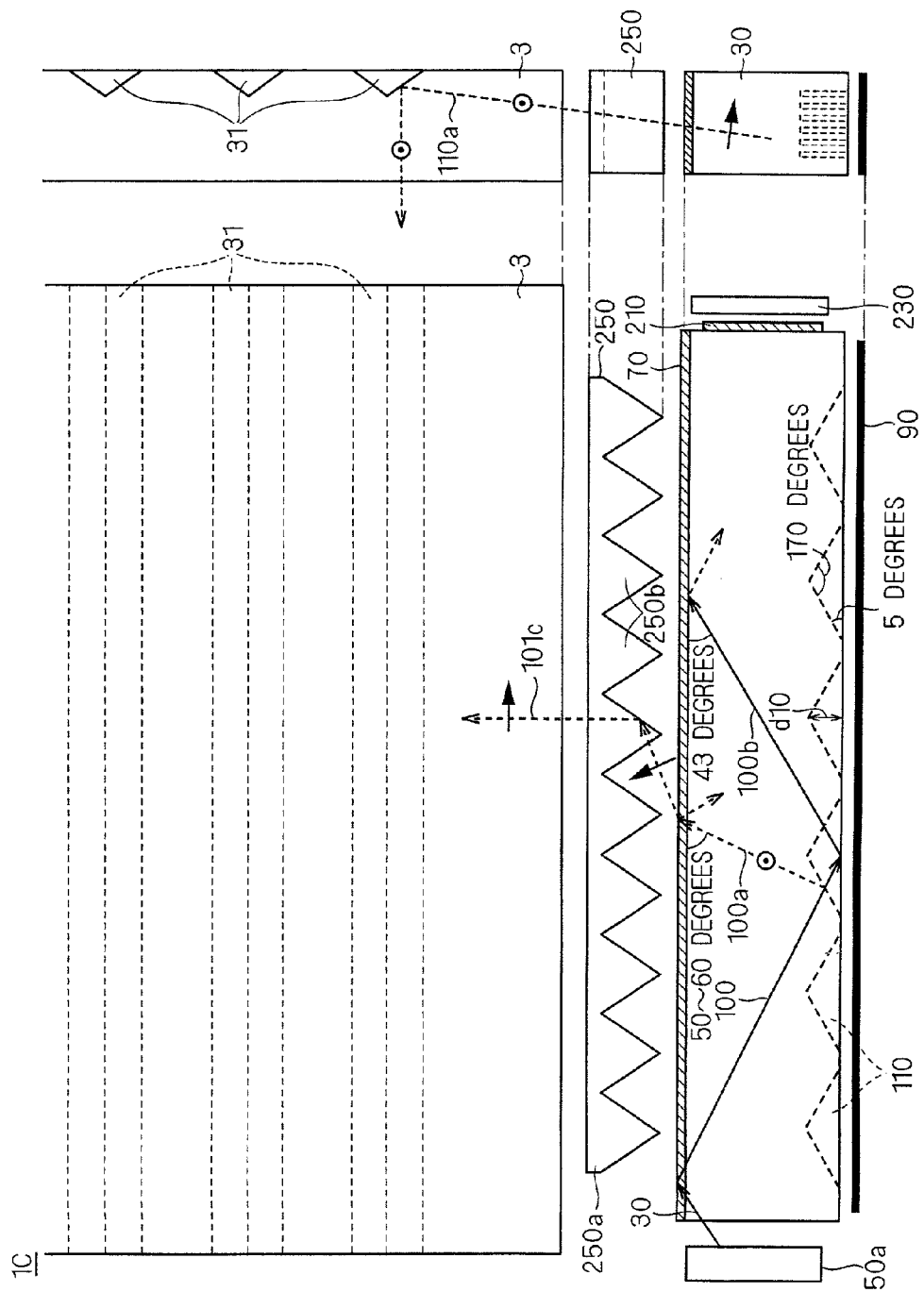
FIG. 16 is a schematic structural diagram (plan view and side view) showing a planar light source device 1C in accordance with a fourth preferred embodiment.

FIG. 16 is a schematic structural diagram of a planar light source device 1C in accordance with the fourth preferred embodiment, showing a plan view of the planar light source device 1C and a side view thereof on its right side. As shown in FIG. 16, the planar light source device 1C comprises the light guide plate 3, a light-source light guide plate 30 which is so arranged to be opposed to at least one of the end surfaces (light incident surface) of the light guide plate 3, and a point light source 50*a* which is so arranged as to be opposed to one of the end surfaces (light incident surface) of the light-source light guide plate 30. The light-source light guide plate 30 serves to refract light 100 from the point light source 50*a* and let the light enter the light incident surface of the light guide plate 3.

The light-source light guide plate 30 of the fourth preferred embodiment has the same configuration as that of the light guide plate 3 of the third preferred embodiment. Specifically, the light-source light guide plate 30 comprises a phase difference plate 70 provided on a front surface (light exit surface) of the light-source light guide plate 30, a reflection sheet 90 which is so arranged as to be opposed to a back surface of the light-source light guide plate 30, a phase difference plate 210 provided on a side surface (reflection surface) opposite to the light incident surface side of the light-source light guide plate 30, a reflection plate 230 opposed to the reflection surface of the light-source light guide plate 30 with the phase difference plate 210 interposed therebetween, and a reverse prism sheet 250 opposed to the light exit surface of the light-source light guide plate 30 with the phase difference plate 70 interposed therebetween.

Though the exemplary case where the light-source light guide plate 30 has the same configuration as that of the light guide plate 3 of the third preferred embodiment is shown herein, a light-source light guide plate having the same configuration as that of the light guide plate 3 of the first preferred embodiment may be used as the light-source light guide plate 30.

The liquid crystal panel 13 (not shown) of a liquid crystal display is arranged in front of the light exit surface of the light guide plate 3. On the surface of the light guide plate 3 opposite to the light exit surface thereof, formed are reflecting prisms 31 each extending in a direction parallel to the light exit surface of the light-source light guide plate 30 and a light incident surface of the light guide plate 3.

Like in the first and third preferred embodiments, the light-source light guide plate 30 is formed of a transparent member such as a transparent resin or the like in, e.g., a rectangular and planar shape. On the back surface (opposite to the surface opposed to the light guide plate 3) inside the light-source light guide plate 30, one or more divided prisms 110 are formed.

The divided prism 110 is so formed as to have the same structure as that of the divided prism 11 of the third preferred embodiment, with the vertex angle of the isosceles triangle being an obtuse angle, e.g., ranging from 160 degrees to 175 degrees (herein, 170 degrees). The height d10 of the divided prism 110 is set to, e.g., 0.22 μm.

The phase difference plate 70 is adhered with its slow axis tilted by 45 degrees with respect to the light incident surface of the light-source light guide plate 30 and has a function of a half wave plate with respect to light which is diagonally incident from the divided prism 110 at an angle ranging from about 50 to 60 degrees. Light diagonally enters the phase difference plate 70 and passes therethrough, and the phase difference plate 70 rotates the direction of the polarization of the light at 90 degrees and lets the light go therethrough.

The phase difference plate 210 is a quarter wave plate arranged with its slow axis tilted by 45 degrees with respect to the direction of the normal of a light radiation surface of the light-source light guide plate 30. The phase difference plate 210 converts linearly polarized light (circularly polarized light) passing therethrough into circularly polarized light (linearly polarized light) and lets the light go therethrough.

The reverse prism sheet 250 has a structure where a plurality of prisms 250b each having a vertex angle of about 60 degrees are formed on a back surface (the surface facing the light-source light guide plate 30) of a sheet portion 250a formed of a transparent member in a sheet-like manner.

The plurality of prisms 250b are formed at predetermined pitch intervals, each extending in parallel with the light incident surface of the light-source light guide plate 30. Each of the prisms 250b has, e.g., an isosceles triangle pole shape and is formed so that a surface thereof on the side of the base of the isosceles triangle may be provided on the back surface of the sheet portion 250a (therefore, the side of the vertex angle of the isosceles triangle faces the side of the light-source light guide plate 30) and the direction of the ridge of the vertex angle of the isosceles triangle may be parallel to the light incident surface of the light-source light guide plate 30.

In the planar light source device 1C, as shown in FIG. 16, when the point light source 50a is lighted, the light 100 from the point light source 50a enters the inside of the light-source light guide plate 30 from the light incident surface of the light-source light guide plate 30 and is propagated while being reflected by an inner surface of the light-source light guide plate 30. At some point, the light is incident on a prism surface of the divided prism 110 and divided into reflected light 100a which is reflected by the prism surface and transmission light 100b which passes through the prism surface. At that time, like in the first preferred embodiment, by virtue of the presence of the dividing portions of the divided prism 110, the reflected light 100a becomes light containing the parallel polarized light having the oscillation direction of the electric field in a direction parallel to the direction of the ridge of the divided prism 110 considerably more than vertically polarized light having the oscillation direction of the electric field in a direction perpendicular to the direction of the ridge of the divided prism 110.

Then, the reflected light 100a exits outside from the light exit surface of the light-source light guide plate 30 and passes through the phase difference plate 70, with the direction of the polarization thereof rotated at 90 degrees (therefore, the reflected light 100a is converted into light containing the vertically polarized light considerably more than the parallel polarized light). Then, the reflected light 100a passes through the reverse prism sheet 250, being refracted in a front direction of the light exit surface of the light-source light guide plate 30, and enters the light guide plate 3. The light 100c entering the light guide plate 3 is propagated inside the light guide plate 3, being reflected by the reflecting prism 31, and exits from the light exit surface of the light guide plate 3 and is applied to the liquid crystal panel 13.

Also in this preferred embodiment, the reflectance of the reflected light 100a at the interface between the inside and the outside (air layer) of the light guide plate 3 has the properties shown in FIG. 15. Therefore, when the reflected light 100a is propagated from the inside of the light-source light guide plate 30 to the outside (air layer), the reflectance of the parallel polarized light is higher than that of the vertically polarized light at the interface between the inside and the outside (in other words, the vertically polarized light can more easily pass therethrough than the parallel polarized light). Since the reflected light 100a which is reflected by the divided prism 110 contains the parallel polarized light considerably more than the vertically polarized light, as discussed above, the phase difference plate 70 rotates the direction of the polarization of the reflected light at 90 degrees so as to convert the reflected light 100a into the light containing the vertically polarized light considerably more than the parallel polarized light, whereby the transmittance of the reflected light 100a from the inside to the outside of the light-source light guide plate 30 can be increased.

Since the vertex angle of the divided prism 110 is an obtuse angle (the prism has a gentle slope) herein, however, the incident angle of the reflected light 100a which is reflected by the prism surface with respect to the light exit surface (i.e., the phase difference plate 70) of the light-source light guide plate 30 is relatively large. As discussed in the third preferred embodiment (FIG. 14), if the incident angle of the incident light 100 is 45 degrees, when the incident light 100 is reflected once by the light exit surface of the light-source light guide plate 30 and after that, the incident light 100 is reflected by the divided prism 110 and enters the light exit surface of the light-source light guide plate 30 again, the incident angle becomes 35 degrees. Therefore, the exit angle of the reflected light 100a from the light-source light guide plate 30 to the outside is relatively large (in other words, it is difficult that the reflected light 100a goes out in the front direction of the light exit surface of the light-source light guide plate 30). Therefore, the reflected light 100a going out from the light-source light guide plate 30 is refracted by the reverse prism sheet 250 and thereby goes out in the front direction of the light exit surface of the light-source light guide plate 30 with high directivity.

On the other hand, the transmission light 100b passes through the divided prism 110 and is propagated while being reflected by the inner surface of the light-source light guide plate 30 and the reflection sheet 90. Then, the transmission light 100b passes through the other end surface of the light-source light guide plate 30 and the phase difference plate 210 and is reflected by the reflection plate 230, and then is propagated inside the light-source light guide plate 30 again. At that time, the polarization state of the transmission light 100b is changed by the birefringent property of the phase difference plate 210 and the light-source light guide plate 30 and the parallel polarized light is increased again.

Then, the transmission light 100b reflected by the reflection plate 230 is propagated, exhibiting the same behavior as that of the incident light 100, since the divided prism 110 has an isosceles triangular shape. It is thereby possible also for the transmission light 100b to effectively exit from the light exit surface of the light-source light guide plate 30.

Thus, the reflected light 100a passing through the reverse prism sheet 250 is emitted mainly in the front direction of the light-source light guide plate 30 (in the direction toward the light guide plate 3) with high directivity and enters the light guide plate 3, with the vertically polarized light contained considerably more than the parallel polarized light.

The light 100c entering the light guide plate 3 is propagated inside the light guide plate 3, being reflected by the reflecting prism 31, and exits from the light exit surface of the light guide plate 3 and is applied to the liquid crystal panel 13. Since the direction of the normal of the reflection surface of the reflecting prism 31 is found in the plane of a reflection optical path of the incident light 100c, when the incident light 100c is reflected by the reflecting prism 31, the ratio of components of the polarized lights is preserved. Therefore, the light to be applied to the liquid crystal panel 13 contains the vertically polarized light considerably more than the parallel polarized light.

Thus, in the planar light source device 1C, like in the first and third preferred embodiments, the light with high degree of polarization (the light containing the light in a specific polarization state at a considerably high rate) can be emitted. As to the directivity of the exit light, the directivity toward the front direction of the light guide plate 3 is higher.

In the planar light source device 1C of the fourth preferred embodiment, since the phase difference plate 70 which rotates the direction of the polarization of the light going out from the front surface of the light-source light guide plate 30 at 90 degrees is provided on the front surface of the light-source light guide plate 30, it is possible to change the exit light which exits from the front surface (the inside) of the light-source light guide plate 30 to the outside (air layer) to the light containing the vertically polarized light having the oscillation direction of the electric field in a direction perpendicular to the direction of the ridge of the divided prism 110 more than the parallel polarized light having the oscillation direction of the electric field in a direction parallel to the direction of the ridge of the divided prism 110. This increases the transmittance of the light at the interface between the inside and the outside (air layer) of the light-source light guide plate 30.

Further, since the reverse prism sheet which has a plurality of prisms extending in a direction parallel to the end surface (light incident surface) of the light-source light guide plate 30 which is opposed to the point light source 50a on a surface thereof facing the light-source light guide plate 30 and refracts the exit light from the front surface (light exit surface) of the light-source light guide plate 30 in the front direction of the front surface of the light-source light guide plate 30 is so arranged as to be opposed to the front surface side of the light-source light guide plate 30 (between the light-source light guide plate 30 and the light guide plate 3), it is possible to propagate the exit light from the front surface of the light-source light guide plate 30 in the front direction of the front surface of the light-source light guide plate 30 even if the exit light is deflected leftward or rightward.

The quarter wave plate 210 and the reflection plate 230 are provided in this order on the side of the other end surface (the surface opposite to the light incident surface) of the light-source light guide plate 30. By the quarter wave plate 210 and the reflection plate 230, the light from the light source 50a which reaches the other end surface of the light-source light guide plate 30 can be converted into light containing more parallel polarized light and reflected, and this increases the light reusability.

Since the reflecting prism 31 of the light guide plate 3 is formed in a direction parallel to the light exit surface of the light-source light guide plate 30 and the light entry surface of the light guide plate 3, the direction of the normal of the reflection surface thereof is found in the plane of the reflection optical path of the incident light 100c. Therefore, when the incident light 100c is reflected by the reflecting prism 31, the ratio of components of the polarized lights is preserved. Therefore, the light to be applied to the liquid crystal panel 13 contains the vertically polarized light considerably more than the parallel polarized light. By adjusting the angle of the transmission axis of a polarizing plate provided in the liquid crystal panel on the side of the planar light source device to the angle of the vertically polarized light in the oscillation direction of the electric field, it is possible to achieve high-efficiency and high-luminance display. Since the directivity of the light to be incident onto the liquid crystal panel is not disturbed, high luminance can be achieved in the front direction of the liquid crystal panel.

As discussed above, the light-source light guide plate 30 may have the same configuration as that of the light guide plate 3 of the first preferred embodiment, and in that case, the same effect can be produced.

Though the planar light source device of the present invention has been discussed by taking the backlight device of a liquid crystal display as an example, application of the present invention is not limited to this case. The planar light source device of the present invention can be used as a planar light source of any equipment which uses polarized light, such as a front light of a reflection type liquid crystal display or the like, and it is obvious that the effect of increasing the luminous efficiency can be produced even if the planar light source device is used thus.

While the invention has been shown and described in detail, the foregoing description is in all aspects illustrative and not restrictive. It is therefore understood that numerous modifications and variations can be devised without departing from the scope of the invention.

The invention claimed is:

1. A planar light source device comprising:
    a planar light guide plate;
    a light source which is so arranged as to be opposed to at least one of both end surfaces of said light guide plate; and
    a divided prism formed in a back surface inside said light guide plate, for reflecting light incident upon said light guide plate from said light source toward a front surface side of said light guide plate,
    wherein said divided prism has a prism portion and a dividing portion both of which have a width equal to or less than the wavelength of light from said light source and is formed with said prism portion and said dividing portion alternately repeated along a direction parallel to said end surface of said light guide plate which is opposed to said light source.

2. The planar light source device according to claim 1, wherein
    said prism portion of said divided prism is a concave portion which is concavely formed in said back surface of said light guide plate.

3. The planar light source device according to claim 1, wherein
    a phase difference plate for rotating a direction of the polarization of light exiting from said front surface of said light guide plate is provided on said front surface of said light guide plate.

4. The planar light source device according to claim 1, wherein
    said divided prism is an isosceles triangle pole prism, with a surface thereof on the side of the base of the isosceles triangle arranged on said back surface of said light guide plate, and has a structure where said prism portion and said dividing portion are alternately repeated in the direction of the ridge of the vertex angle of the isosceles triangle.

5. The planar light source device according to claim 4, wherein
said vertex angle of said divided prism is an obtuse angle ranging from 160 degrees to 175 degrees.

6. The planar light source device according to claim 1, wherein
a reverse prism sheet for refracting light exiting from said front surface of said light guide plate to the front direction of said front surface of said light guide plate is provided in front of said front surface of said light guide plate, said reverse prism sheet having a plurality of prisms on a surface thereof opposed to said light guide plate, said plurality of prisms extending in a direction parallel to said end surface of said light guide plate which is opposed to said light source.

7. The planar light source device according to claim 1, wherein
when said light source is so arranged as to be opposed to only one of said end surfaces of said light guide plate, a quarter wave plate and a reflection plate are provided in this order on the other end surface of said light guide plate.

8. The planar light source device according to claim 1, wherein
when light from said light source is visible light, the width of each of said prism portion and said dividing portion of said divided prism is not larger than 0.8 µm.

9. The planar light source device according to claim 1, wherein
the length of said divided prism in a direction of the repetition of said prism portion and said dividing portion ranges from 1 µm to 50 µm.

10. A method of manufacturing a divided prism mold in which a plurality of prism mold portions to be used for forming prism portions of a divided prism having an isosceles triangle pole shape are formed longitudinally and latitudinally in a projecting manner, comprising the steps of:

forming a base mold in which a plurality of ridge portions are formed by electroforming on a bottom-surface mold portion in parallel straight lines at predetermined intervals;

applying a protective agent on said base mold so as to coat said plurality of ridge portions and curing said protective agent;

forming concavely a plurality of trough portions each having an inverted triangular cross section or an inverted trapezoidal cross section by cutting in a surface of said protective agent applied on said base mold at such a depth as to reach near a surface of said bottom-surface mold portion so that said trough portions linearly extend in a direction orthogonal to said ridge portions and forming said prism mold portions from said ridge portions; and removing said protective agent.

11. A planar light source device comprising:
a planar light guide plate;
a light-source light guide plate which is so arranged as to be opposed to at least one of both end surfaces of said light guide plate;
a light source which is so arranged as to be opposed to at least one of both end surfaces of said light-source light guide plate;
a reflecting prism formed in a back surface inside said light guide plate, extending in a direction parallel to said light-source light guide plate; and
a divided prism formed in a surface inside said light-source light guide plate which is opposite to a surface thereof opposed to said light guide plate, for reflecting light incident upon said light-source light guide plate from said light source toward said surface opposed to said light guide plate,
wherein said divided prism has a prism portion and a dividing portion both of which have a width equal to or less than the wavelength of light from said light source and is formed with said prism portion and said dividing portion alternately repeated along a direction parallel to said end surface of said light guide plate which is opposed to said light source.

* * * * *